(12) United States Patent
Liu

(10) Patent No.: US 12,137,493 B2
(45) Date of Patent: Nov. 5, 2024

(54) METHOD AND APPARATUS FOR HANDLING NON-IP DATA NETWORK CONNECTIVITY AND RESTRICTIONS

(71) Applicant: NOKIA TECHNOLOGIES OY, Espoo (FI)

(72) Inventor: Jennifer J-N Liu, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 263 days.

(21) Appl. No.: 17/627,234

(22) PCT Filed: Jul. 15, 2020

(86) PCT No.: PCT/US2020/042140
§ 371 (c)(1),
(2) Date: Jan. 14, 2022

(87) PCT Pub. No.: WO2021/011656
PCT Pub. Date: Jan. 21, 2021

(65) Prior Publication Data
US 2022/0264683 A1  Aug. 18, 2022

Related U.S. Application Data

(60) Provisional application No. 62/874,489, filed on Jul. 15, 2019.

(51) Int. Cl.
*H04W 76/18* (2018.01)
*H04W 48/16* (2009.01)
(Continued)

(52) U.S. Cl.
CPC ........... *H04W 76/18* (2018.02); *H04W 48/16* (2013.01); *H04W 60/04* (2013.01); *H04W 84/042* (2013.01)

(58) Field of Classification Search
CPC ..... H04W 76/18; H04W 48/16; H04W 60/04; H04W 84/042
See application file for complete search history.

(56) References Cited

U.S. PATENT DOCUMENTS

2018/0376444 A1 12/2018 Kim et al.
2019/0021064 A1* 1/2019 Ryu ...................... H04W 60/06
(Continued)

FOREIGN PATENT DOCUMENTS

WO   WO 2018/235795 A1   12/2018
WO   WO 2019/098389 A1   5/2019

OTHER PUBLICATIONS

First Examination Report for Indian Application No. 202247006923 dated Jun. 6, 2022, 8 pages.
(Continued)

*Primary Examiner* — Diane D Mizrahi
(74) *Attorney, Agent, or Firm* — Lippes Mathias LLP

(57) ABSTRACT

A method, apparatus and computer program product are provided herein for handling rejection cases related to Protocol Data Unit (PDU) session establishment. For example, a method is provided that comprises causing transmission of a PDU session establishment request message for a PDU session of a data session type to a data network, receiving a response message to the PDU session establishment request message indicating that the PDU session establishment request for the PDU session of the data session type to the data network is rejected, wherein the response message comprises a rejection cause, and analyzing the rejection cause to identify re-attempt criteria for transmission of a further PDU session establishment request message for a PDU session of a further data session type or to a further data network.

20 Claims, 20 Drawing Sheets

(51) Int. Cl.
*H04W 60/04* (2009.01)
*H04W 84/04* (2009.01)

(56) References Cited

U.S. PATENT DOCUMENTS

2020/0120738 A1 4/2020 Kawasaki et al.
2020/0336964 A1 10/2020 Kawasaki et al.

OTHER PUBLICATIONS

International Search Report and Written Opinion for Patent Cooperation Treaty Application No. PCT/US2020/042140 dated Sep. 11, 2020, 10 pages.
"PDU session rejection due to missing or unknown DNN", 3GPP TSG-CT WG1 Meeting #119, C1-19xxxx, Nokia, Aug. 26-30, 2019, 6 pages.
"Ethernet PDU session type", 3GPP TSG-CT WG1 Meeting #119, C1-19xxxx, Nokia, Aug. 26-30, 2019, 6 pages.
"Retry restriction handling for Ethernet PDU session", 3GPP TSG-CT WG1 Meeting #119, C1-19xxxx, Nokia, Aug. 26-30, 2019, 6 pages.
Office Action received for corresponding European Patent Application No. 20750998.5, dated Apr. 22, 2024, 6 pages.
Office Action received for corresponding Indonesian Patent Application No. P00202201031, dated Jul. 22, 2024, 3 pages of Office Action and 3 pages of translation available.

\* cited by examiner

Cause value (octet 2)

| Bits 8 | 7 | 6 | 5 | 4 | 3 | 2 | 1 | |
|---|---|---|---|---|---|---|---|---|
| 0 | 0 | 1 | 1 | 0 | 0 | 1 | 1 | ... |
| 0 | 0 | 1 | 1 | 0 | 1 | 1 | 1 | ... |
| 0 | 0 | 1 | 1 | 1 | 0 | 0 | 0 | ... |
| 0 | 0 | 1 | 1 | 1 | 1 | 1 | 1 | PDU Session type Unstructured only allowed |
| 0 | 0 | 1 | 1 | 1 | 0 | 0 | 1 | ... |
| 0 | 1 | 0 | 0 | 0 | 0 | 1 | 1 | ... |
| 0 | 1 | 0 | 0 | 1 | 0 | 0 | 0 | ... |

Any other value received by the UE shall be treated as 0010 0010, "service option temporarily out of order". Any other value received by the network shall be treated as 0110 1111, "protocol error, unspecified".

Figure 5

| Cause value (octet 2) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 1 | 1 | 0 | 0 | 1 | 1 | ... |
| 0 | 0 | 1 | 1 | 0 | 1 | 1 | 1 | ... |
| 0 | 0 | 1 | 1 | 1 | 0 | 0 | 0 | ... |
| 0 | 0 | 1 | 1 | 1 | 0 | 1 | 0 | <u>PDU Session type Ethernet only allowed</u> |
| 0 | 0 | 0 | 1 | 1 | 1 | 0 | 1 | ... |
| 0 | 1 | 0 | 0 | 0 | 0 | 1 | 1 | ... |
| 0 | 1 | 0 | 0 | 1 | 0 | 0 | 0 | ... |

Any other value received by the UE shall be treated as 0010 0010, "service option temporarily out of order". Any other value received by the network shall be treated as 0110 1111, "protocol error, unspecified".

Figure 8

Figure 9. Ethernet PDU session establishment failed due to Service option not supported

METHOD AND APPARATUS FOR HANDLING NON-IP DATA NETWORK CONNECTIVITY AND RESTRICTIONS

CROSS-REFERENCE TO RELATED APPLICATIONS

This application is a national phase entry of International Application No. PCT/US2020/042140, filed Jul. 15, 2020, which claims priority to U.S. Provisional Application No. 62/874,489 filed Jul. 15, 2019, which is hereby incorporated herein in its entirety by reference.

TECHNICAL FIELD

An example embodiment of the present disclosure relates to handling data connection failures. In particular, an example embodiment relates to arrangements providing improvements in terms of data network connectivity restriction handling based on at least a data connection rejection cause, an access type, and a re-attempt indicator.

BACKGROUND

The fifth generation of mobile networks (5G networks) is expected to be the next major phase of mobile telecommunication standards and to bring many improvements in mobile network user experience. For instance, 5G networks should provide new technical solutions allowing a greater throughput, lower latency, higher reliability, higher connectivity and higher mobility range.

In addition to these improvements and in terms of performance, 5G networks are also expected to extend the flexibility in the network usage and to provide users with a wider range of use cases and business models.

Currently, there are requirements in the 3rd Generation Partnership Project (3GPP) to enable native support of non-IP types of network connectivity for transporting Ethernet frames, and other structured or non-structured payloads. For 5G networks, normal handling to support establishment of protocol data unit (PDU) sessions of Ethernet and unstructured PDU session types has been specified. However, in some cases it is possible that during network roll out, connectivity support for non-IP types of transport services is limited to a subset of network functions. Also depending on operator configuration, Data Network Name (DNN) for Ethernet or unstructured PDU sessions may not be accessible.

Additionally, a user equipment's (UE) data connectivity may be restricted by the UE's subscription. For example, Internet of Things (IoT) devices for Vertical local area network (LAN) deployment may be limited to an Ethernet type of data network connection, as compared to IoT devices for metering or vending machines which may be restricted to an unstructured type of network connectivity such as, for example, short message service (SMS) services. All these situations could lead to failure in establishing Ethernet or unstructured data connections.

SUMMARY

To address these needs such as to prevent UE from suffering service interruptions, certain embodiments of the present disclosure provide for specified UE behaviour in such failure cases involving failure to establish an Ethernet or unstructured data connection. Furthermore, mobility support for mapping non-IP types of network connectivity during handover needs may be specified to enable continuity of services in at least some embodiments. A first aspect of an example embodiment of the present disclosure relates to methods, apparatuses, and computer program products configured to cause transmission of a PDU session establishment request message for a PDU session of a data session type to a data network, receive a response message to the PDU session establishment request message indicating that the PDU session establishment request for the PDU session of the data session type to the data network is rejected, wherein the response message comprises a rejection cause and analyze the rejection cause to identify re-attempt criteria for transmission of a further PDU session establishment request message for a PDU session of a further data session type or to a further data network. The methods, apparatuses, and computer program products are further configured to after determining that at least one of the re-attempt criteria is satisfied, cause transmission of the further PDU session establishment request message for the PDU session of the further data session type or to the further data network.

In another example embodiment, methods, apparatuses, and computer program products are provided and configured to receive a PDU session establishment request message for a PDU session of a data session type to a data network, determine the data session type is not supported, and transmit a response message to the PDU session establishment request message indicating that the PDU session establishment request for the PDU session of the data session type to the data network is rejected, wherein the response message comprises a rejection cause.

BRIEF DESCRIPTION OF THE DRAWINGS

Certain embodiments of the present disclosure are illustrated by way of example, and not by way of limitation, in the figures of the accompanying drawings, in which like reference numerals refer to similar elements and in which:

FIG. 5 depicts a 5GSM cause information element when only an unstructured type of PDU session type is allowed;

FIG. 8 depicts a 5GSM cause information element when an Ethernet only type of PDU session is allowed;

DESCRIPTION OF CERTAIN EXAMPLE EMBODIMENTS

Figure 1A:
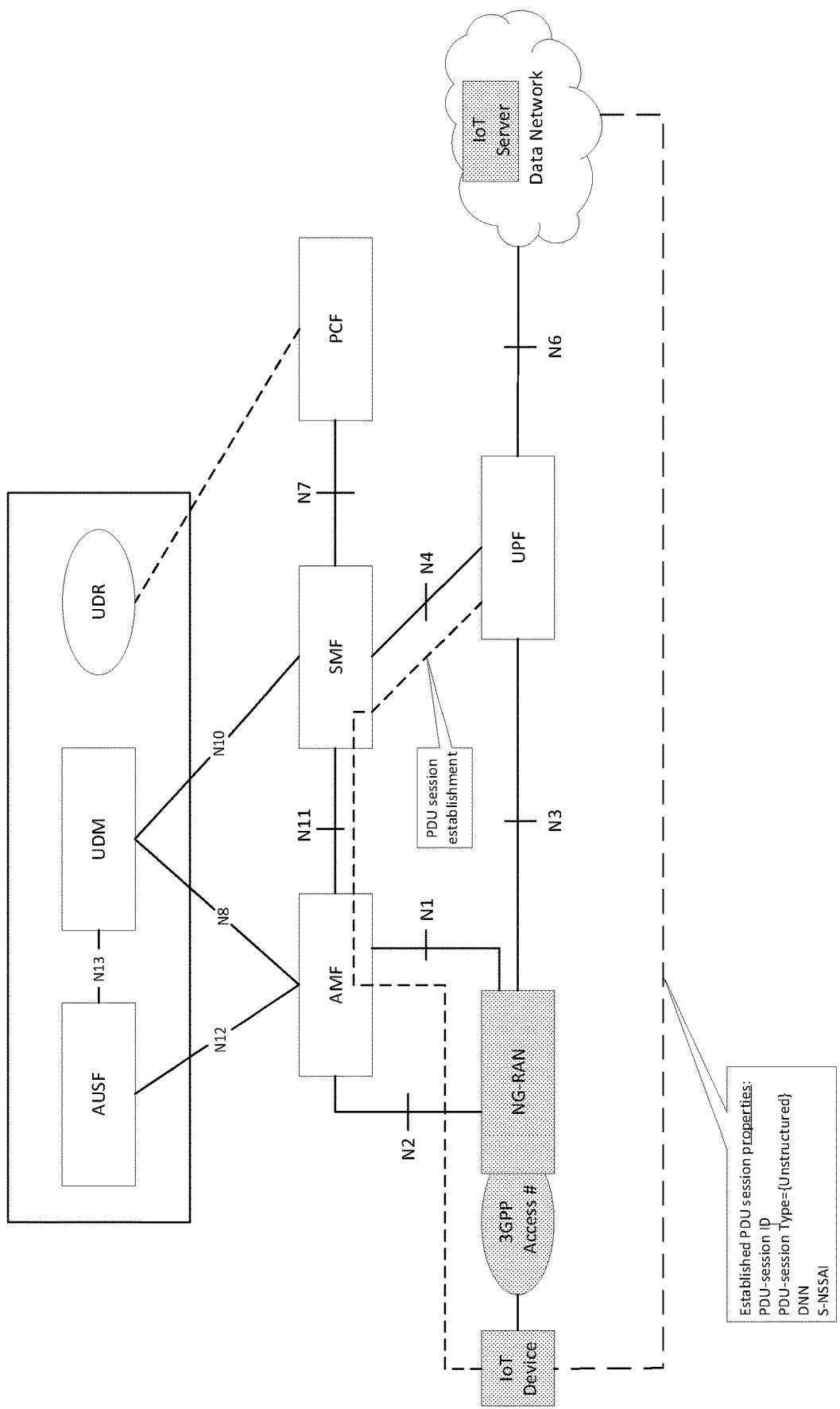
FIG. 1A depicts data connectivity for unstructured payloads between the UE and an external data network.

Some embodiments will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Referring now to FIG. 1*a*, the establishment of data network connectivity for unstructured payloads is illustrated in an instance in which the UE accesses the external data network via the 5G core over 3GPP access.

At least one purpose of the packet core network is to provide UE data connection towards an external packet data network, such as a special purpose network like a virtual private network (VPN) or the Internet. The traditional connection type towards the data network is via an Internet Protocol (IP) connection. However, with the advent of Internet of Things devices (IoT), many different connection types need to be supported. Many IoT devices are low cost devices deployed in massive numbers and connected to the enterprise network via non-IP communication. As such, for these IoT devices, upgrading them to IP connectivity is both unnecessary due to low data volume and expensive. In addition, traditional wireless core networks have been mostly designed to handle connectivity from a device that exhibits nomadic behavior. However, with the integration of fixed networks and the introduction of industrial IoT devices for support of a Vertical LAN in 5G network, native support of other types of network connectivity such as Ethernet frames, Multiprotocol Label Switching (MPLS), and other structured or non-structured payloads is required.

Figure 1B:
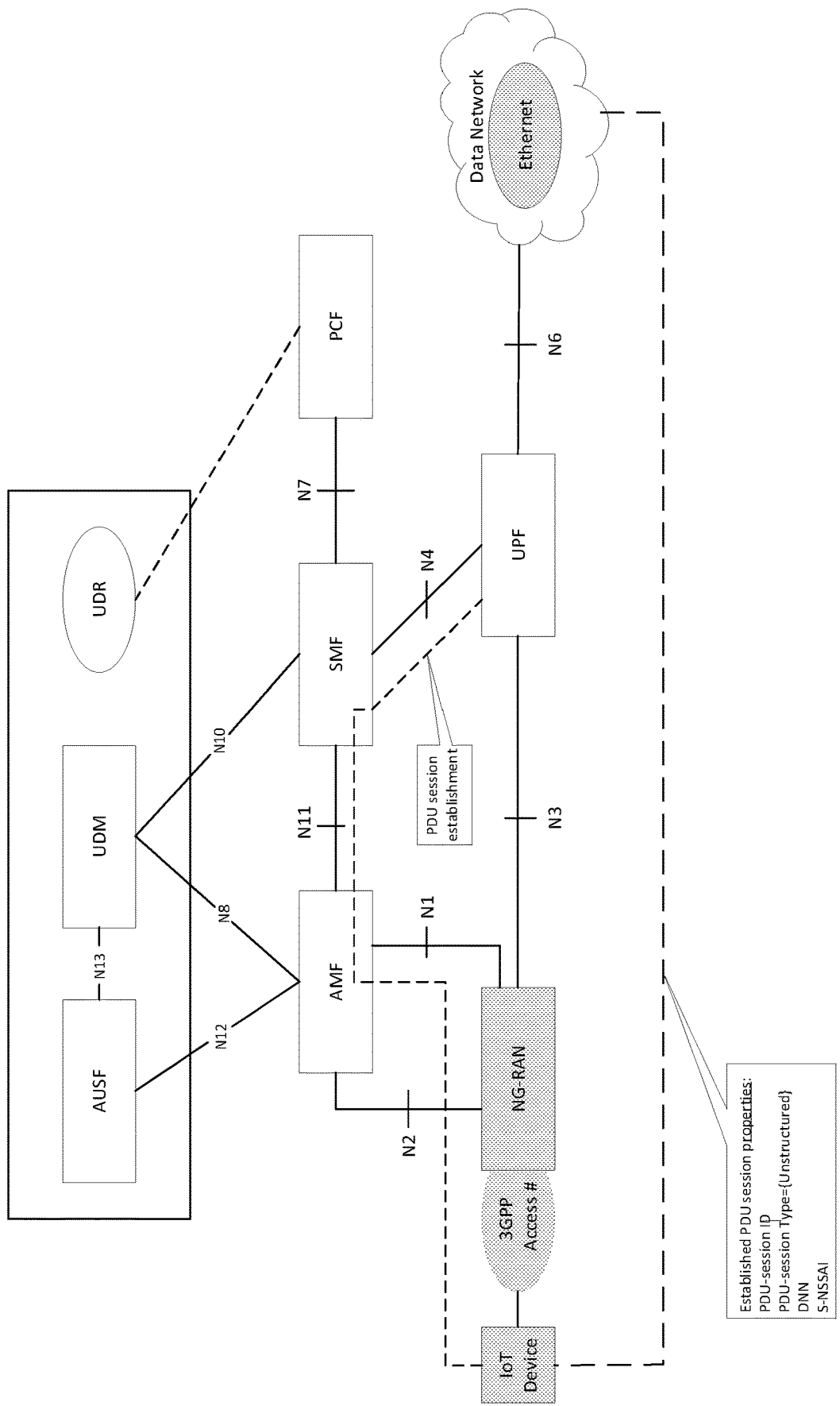
FIG. 1B depicts an Ethernet PDU session for accessing an external data network.
Figure 1C:
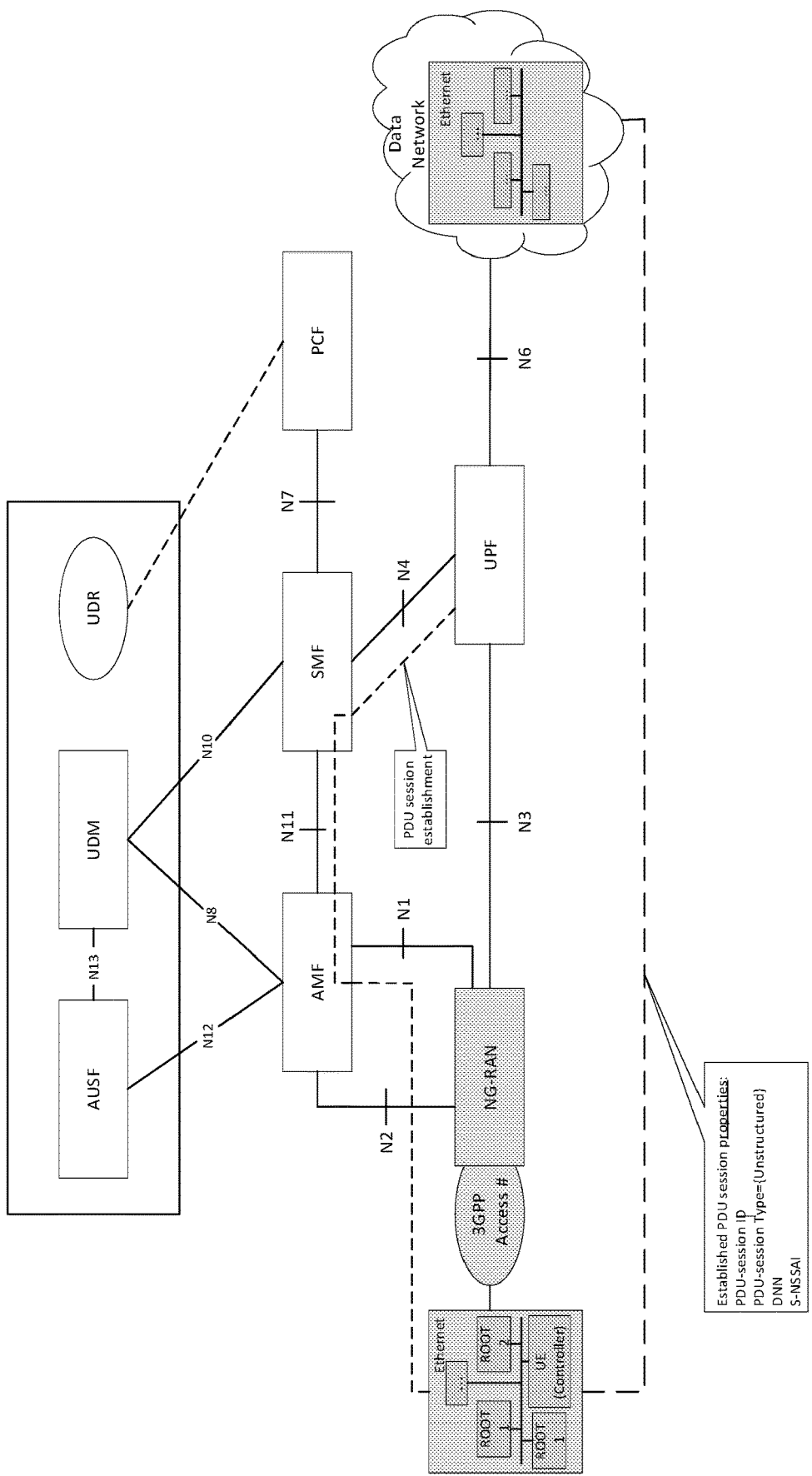
FIG. 1C depicts a distributed Ethernet PDU session for Vertical LAN IoT deployment.

FIG. 1*b* illustrates the IoT device establishing the Ethernet type of layer 2 connectivity towards a remote Ethernet data network. FIG. 1*c* shows the industrial IoT deployment in which a robot controller from a local Ethernet network connects to a remote Ethernet data network via an Ethernet PDU session connection.

Figure 2:
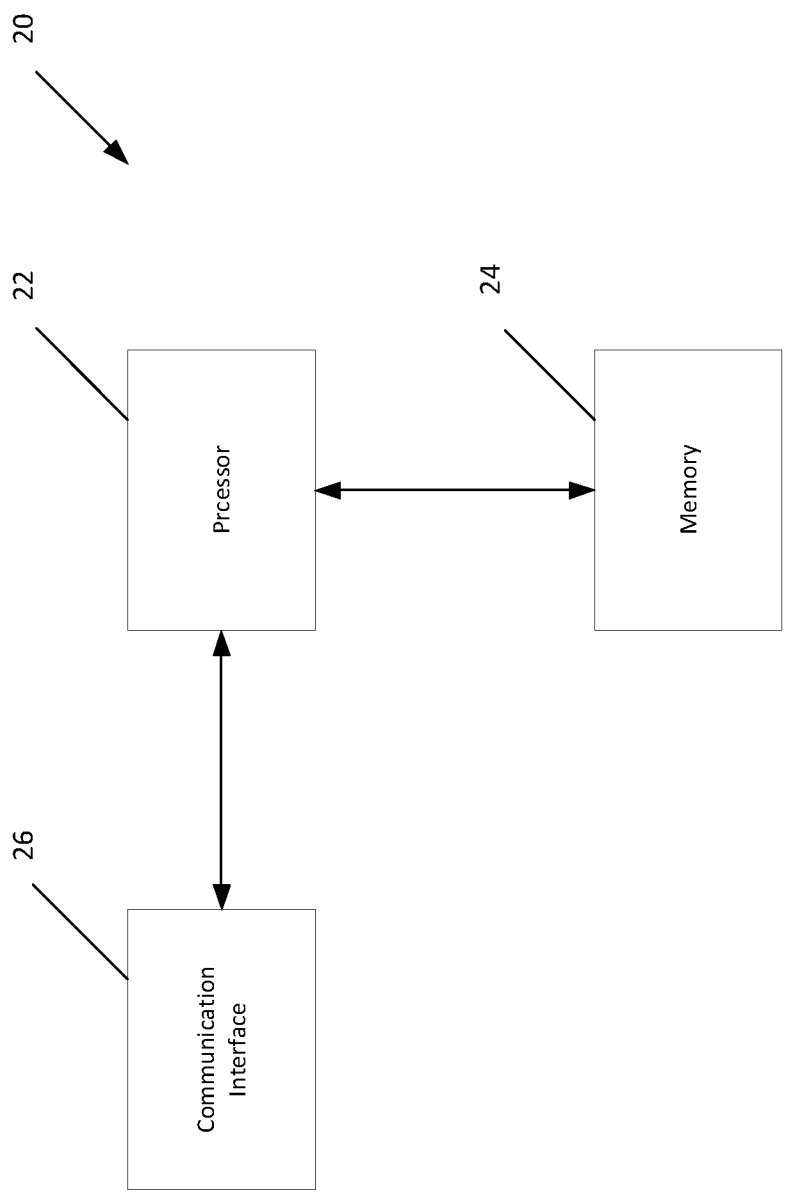
FIG. 2 is a block diagram of an apparatus configured in accordance with an example embodiment.

Referring to FIG. 2, an apparatus is configured to provide non-IP data network connectivity may be embodied by any of a variety of different components and, in one embodiment, is embodied by a virtual network controlling infrastructure in a 5G communication system. As shown in FIG. 2, the apparatus of an example embodiment includes, is associated with or is otherwise in communication with a processor 22, an associated memory 24 and a communication interface 26.

The processor 22 (and/or co-processors or any other circuitry assisting or otherwise associated with the processor) may be in communication with the memory device 24 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally, or alternatively, the memory device could be configured to store instructions for execution by the processor.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally, or alternatively, the processor may include one or more processors configured in tandem via the bus to enable independent execution of instructions, pipelining and/or multi-threading.

In an example embodiment, the processor 22 may be configured to execute instructions stored in the memory device 24 or otherwise accessible to the processor. Alternatively, or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The communication interface 26 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The apparatus 20, such as the processor 22, may be configured to perform the various functions described below. For example, the apparatus may be embodied by a network device, such as the AMF and/or the SMF, and may be configured to perform the functions described below to be performed by the network device. Alternatively, the apparatus may be embodied by the UE and may be configured the function described below to be performed by the UE.

Figure 3:
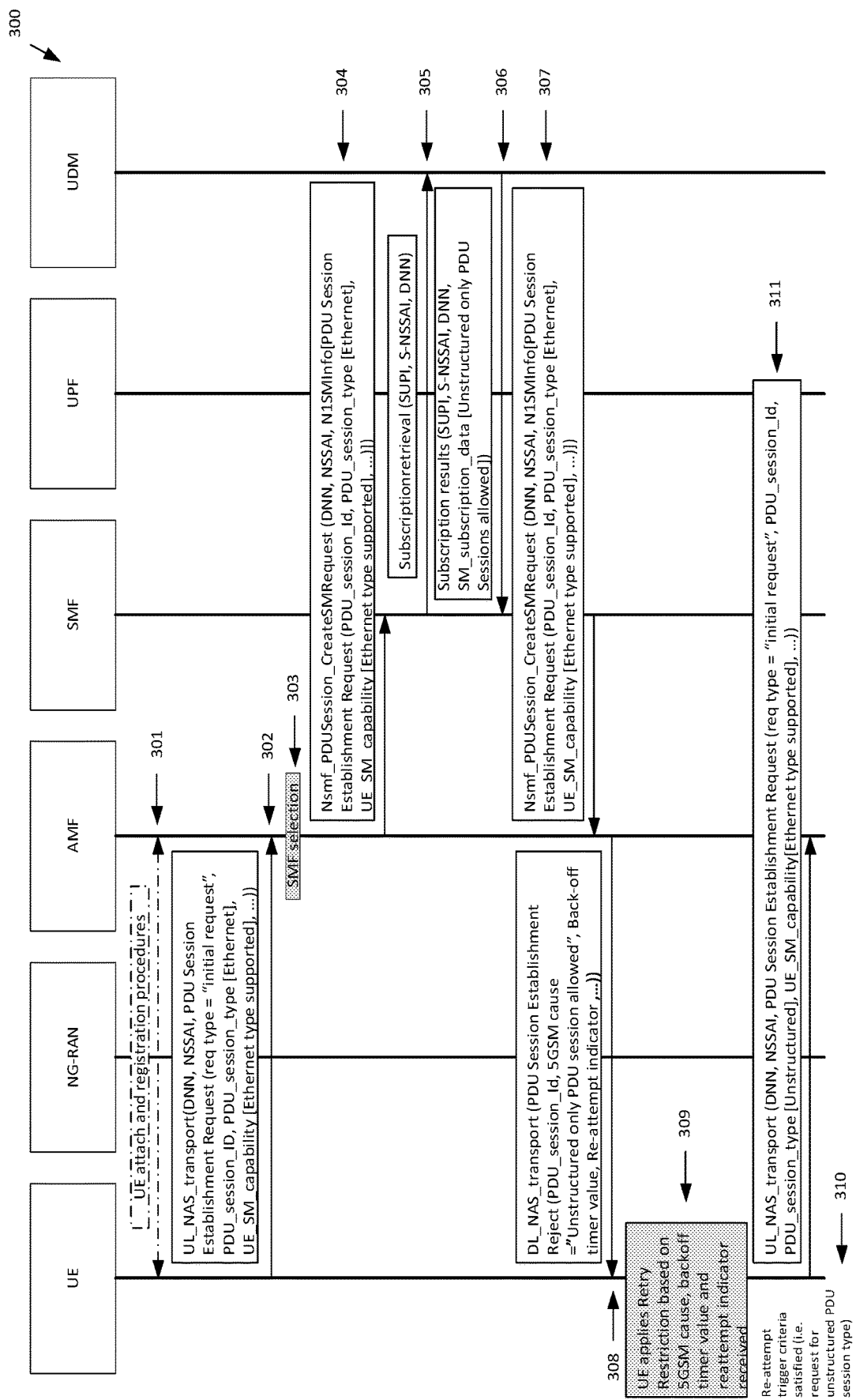
FIG. 3 illustrates operations performed, such as by the apparatus of FIG. 2 related to Ethernet PDU session establishment re-attempt when only an unstructured type of PDU session is allowed.

A. Handling Failure of an Ethernet Data Connection Establishment and an Ethernet PDU Session Establishment Re-Attempt when Only an Unstructured PDU Session is Allowed FIG. 3 shows the example message flow 300 in an instance in which an Ethernet PDU session establishment in a 5G core (5GC) network failed due to only an unstructured type of PDU session being allowed and the UE re-attempts after the re-attempt triggering criteria is satisfied. As shown in FIG. 3, after the UE has registered to the 5G core network via UE attach and registration procedures 301. In 302, the UE initiates a PDU Session Establishment procedure by sending a non-access stratum (NAS) message to the AMF encapsulating a PDU Session Establishment Request message with the PDU session type set to "Ethernet" within the N1 SM container.

The AMF then performs SMF (Session Management Function) selection 303 and initiates a Nsmf_PDUSession_CreateSMContext Request towards the selected SMF, indicating the requested data connection type to be "Ethernet" 304.

In an example embodiment, as shown in FIG. 3, according to the UE subscription or operator policy 305, only an Unstructured PDU session is allowed for this UE 306. Thus, in 307, the SMF rejects the UE's request for Ethernet PDU session establishment by sending a Nsmf_PDUSession_CreateSMContext Response message towards the AMF, indicating the rejection cause as "PDU session type Unstructured only allowed." In an example embodiment, in 308, the AMF then initiates a Downlink NAS Transport procedure to forward the PDU session reject message to the UE including the rejection cause "PDU session type Unstructured only allowed".

In an example embodiment, upon receiving the PDU session reject message from the AMF indicating the rejection cause as "PDU session type Unstructured only allowed", the UE proceeds by first, applying a retry restriction 309 based on a received re-attempt indicator and will not send another PDU SESSION ESTABLISHMENT REQUEST message for the same DNN and the same S-NSSAI using the "Ethernet" PDU session type unless one of the re-attempt triggering criteria is met 310. However, in 311, the UE is allowed to initiate PDU session establishment for an "Unstructured" PDU session type. The UE of an example embodiment is further configured to ignore the Back-off timer value information element (IE) provided by the network and the RATC bit in the re-attempt indicator IE provided by the network. In other words, in an example embodiment, if the network indicates that only unstructured PDU session type is supported, the UE should attempt to establish a PDU session with the supported PDU session type instead of attempting (or retrying) the PDU session type that is not allowed (e.g., not the same as the PDU session type indicated by the network as supporting).

Based on the scenario below, the re-attempt triggering criteria provided by or associated with the re-attempt indicator may be one of the following: the UE is switched off or the subscriber identity module (SIM) or universal subscriber identity module (USIM) is removed; the UE initiates a PDU SESSION ESTABLISHMENT REQUEST message for a different PDU session type; the UE is registered to a different PLMN which was not in the list of equivalent PLMNs at the time when the PDU SESSION ESTABLISHMENT REJECT message was received; or the UE is registered to a different PLMN which was in the list of equivalent PLMNs at the time when the PDU SESSION ESTABLISHMENT REJECT message was received, and the re-attempt indicator IE included in the PDU SESSION ESTABLISHMENT REJECT message indicated that a re-attempt in an equivalent PLMN is allowed.

Figure 4:
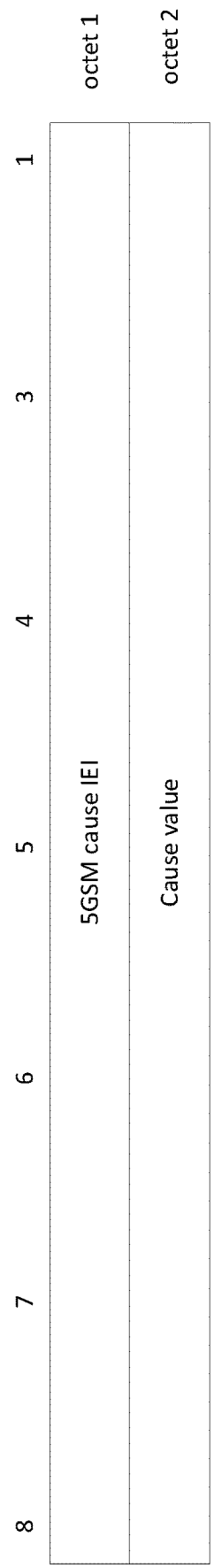
FIG. 4 depicts a 5GSM (Global System for Mobile communication) cause information element.

According to the above, cause codes to signal data network connectivity restrictions are provided with examples depicted in FIGS. 4 and 5 due to a subscription for an Ethernet only data connection. FIG. 4 illustrates a 5GSM cause information element indicative of the reason why a 5GSM request is rejected. In an example embodiment, a cause code "PDU session type Ethernet only allowed" is established to signal a data network connectivity restriction due to the subscription being such to allow only an Ethernet data connection. For example, cause code #58 may be utilized to indicate that only an Unstructured type of PDU session type is allowed for the requested data network connectivity. The cause code may be signalled using a 5GSM cause information element (e.g., assigned code point #71) as shown in FIG. 5.

B. Handling Failure of an Unstructured Data Connection Establishment and a PDU Session Establishment Re-Attempt when Only an Ethernet PDU Session is Allowed FIG. 6 illustrates an example message flow in which an unstructured PDU session establishment in a 5GC network failed due to the allowance of only an Ethernet type of PDU session allowed and the UE then re-attempts after the re-attempt triggering criteria is satisfied.

Figure 6:
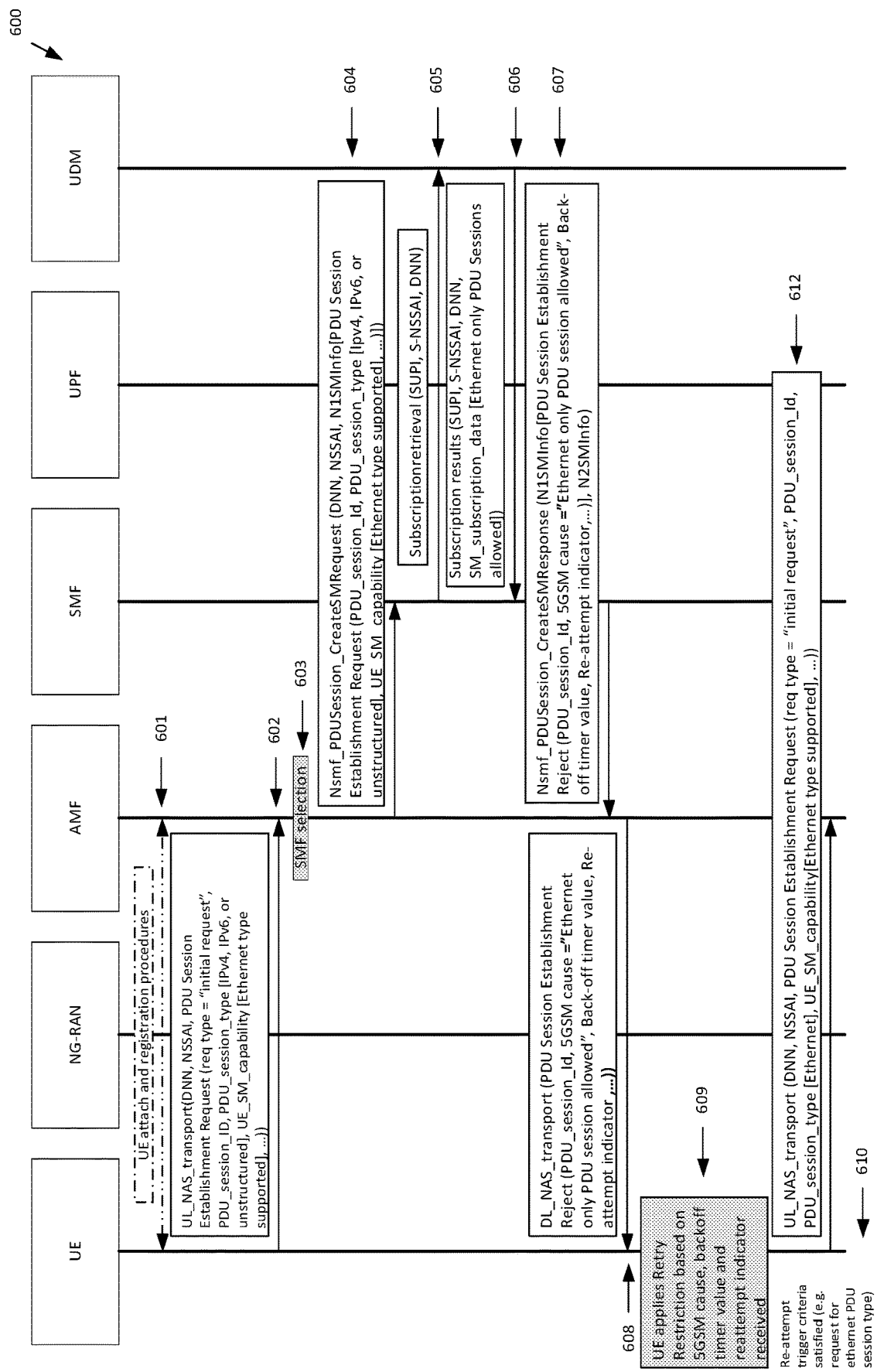
FIG. 6 illustrates operations performed, such as by the apparatus of FIG. 2 related to Ethernet PDU session establishment re-attempt when only an Ethernet type of PDU session is allowed.

In the example embodiment depicted in FIG. 6, after the UE has registered to the 5G core network in 601. In 602, the UE initiates a PDU Session Establishment procedure by sending a NAS message to the AMF encapsulating a PDU Session Establishment Request message with a PDU session type set to "Unstructured" within the N1 SM container. The AMF performs SMF selection in 603 and initiates a Nsmf_PDUSession_CreateSMContext Request towards the selected SMF, indicating the requested data connection type to be "Unstructured" in 604.

Based on the UE subscription or operator policy 605, only an Ethernet PDU session is allowed for this UE in this example embodiment 606. In 607, the SMF rejects the UE's request for Unstructured PDU session establishment by sending a Nsmf_PDUSession_CreateSMContext Response message towards the AMF, indicating the rejection cause as "PDU session type Ethernet only allowed".

In an example embodiment, in 608, the AMF initiates a Downlink NAS Transport procedure to forward the PDU session reject message to the UE including the rejection cause "PDU session type Ethernet only allowed". According to the scenario illustrated in FIG. 6, upon receiving the PDU session reject message from the AMF indicating the rejection cause as "PDU session type Ethernet only allowed", the UE proceeds as follows: the UE applies retry restriction 609 based on the received re-attempt indicator and will not send another PDU SESSION ESTABLISHMENT REQUEST message for the same DNN and the same S-NSSAI using the "Unstructured" PDU session type unless one of the re-attempt triggering criteria is met 610. However, the UE is allowed to initiate PDU session establishment for an "Ethernet" PDU session type. In an example embodiment, the UE ignores the Back-off timer value IE provided by the network and the RATC bit in the re-attempt indicator IE provided by the network.

In an example embodiment, the re-attempt trigger criteria for the rejection cause of "PDU session type Ethernet only allowed" may include one of the following: the UE is switched off or the SIM or USIM is removed; the UE initiates a PDU SESSION ESTABLISHMENT REQUEST message 612 for a different PDU session type (not an "Unstructured" type); the UE is registered to a different PLMN which was not in the list of equivalent PLMNs at the time when the PDU SESSION ESTABLISHMENT REJECT message was received; and the UE is registered to a different PLMN which was in the list of equivalent PLMNs at the time when the PDU SESSION ESTABLISHMENT REJECT message was received, and the re-attempt indicator IE included in the PDU SESSION ESTABLISHMENT REJECT message indicated that re-attempt in an equivalent PLMN is allowed.

Figure 7:
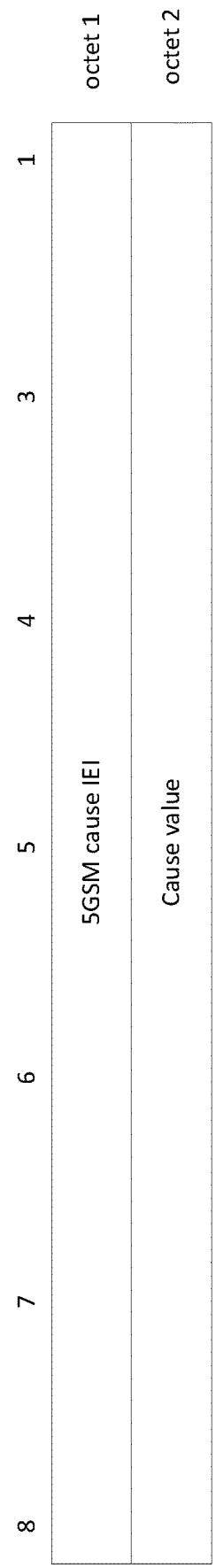
FIG. 7 depicts a 5GSM cause information element.

Accordingly, cause codes to signal a data network connectivity restriction due to a subscription for Ethernet only data connection are established as shown in FIGS. 7 and 8. In an example embodiment, a new cause code "PDU session type Ethernet only allowed" is established to signal a data network connectivity restriction due to the UE subscription allowing only an Ethernet data connection. For example, cause #61 may be defined to indicate that only an Ethernet type of PDU session is allowed. This 5GSM cause is used by the network to indicate that only an Ethernet type of PDU session is allowed for the requested data network connectivity. The new cause may be signalled using a 5GSM cause information element (e.g., assigned code point #71) as shown in FIG. 8.

Figure 9:
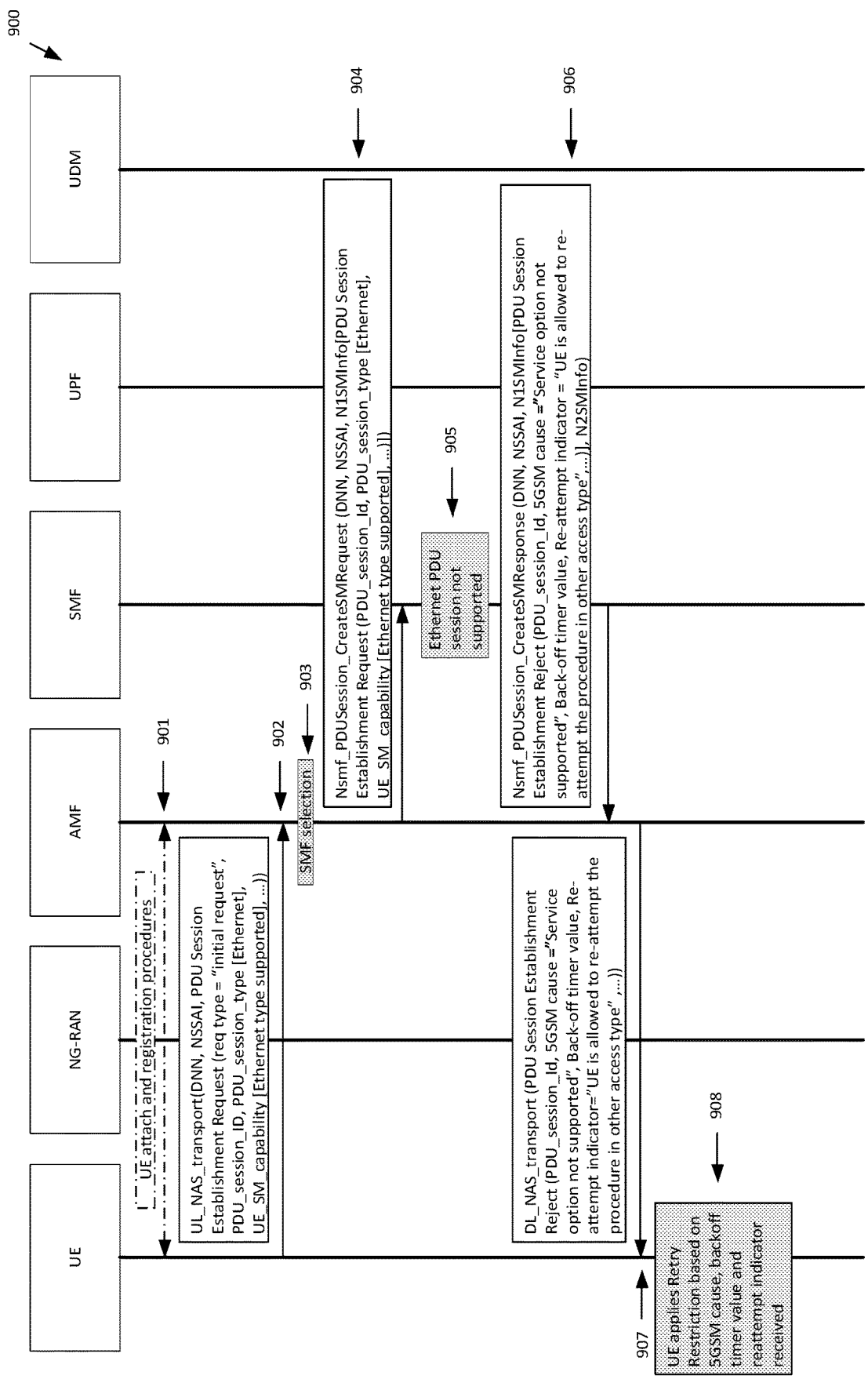
FIG. 9 illustrates operations performed, such as by the apparatus of FIG. 2 related to Ethernet PDU session establishment failure due to service option not being supported.
Figure 10:
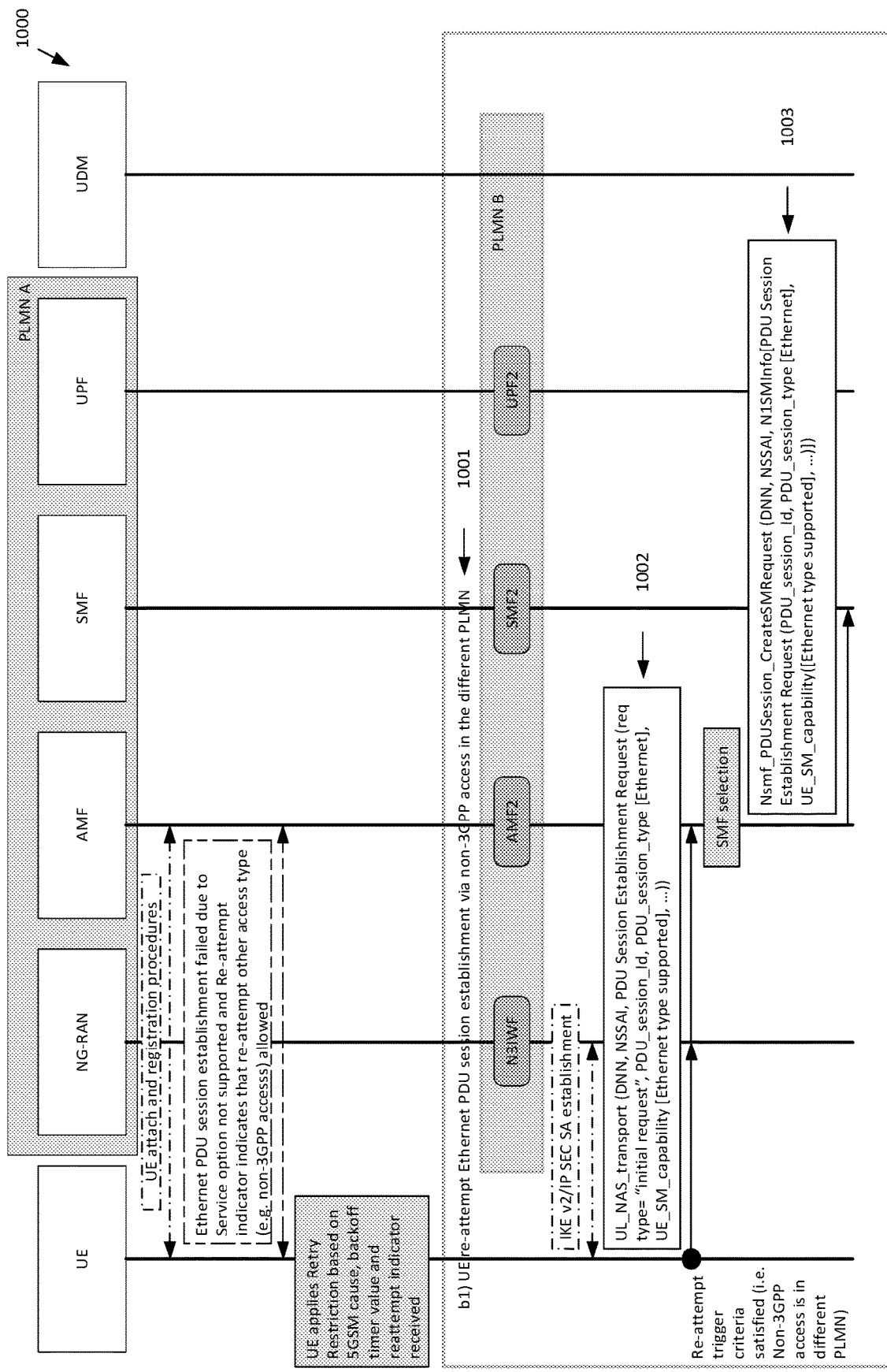
FIG. 10 illustrates operations performed, such as by the apparatus of FIG. 2 related to an Ethernet PDU session establishment re-attempt via non-3GPP access in a different Public Land Mobile Network (PLMN)
Figure 11:
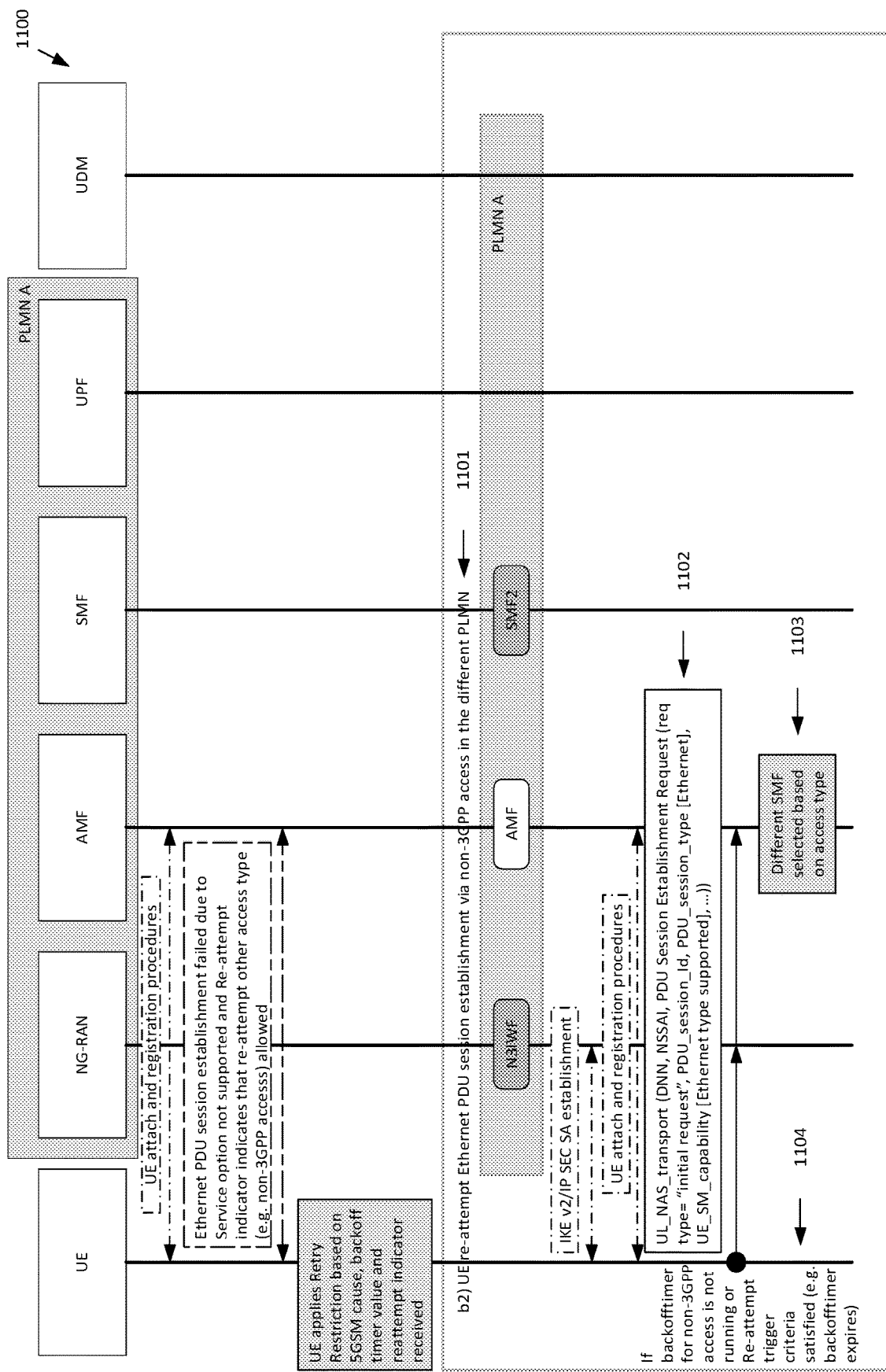
FIG. 11 illustrates operations performed, such as by the apparatus of FIG. 2 related to an Ethernet PDU session establishment re-attempt via non-3GPP access in the same PLMN.

C. Handling Failure of Ethernet Data Connection Establishment and Ethernet PDU Session Establishment Re-Attempt Over Another Access Type in the Same or Different PLMN after Failure Due to a Service Option not being Supported Over One Access Type FIG. 9 illustrates an example message flow in an instance in which Ethernet PDU session establishment in a 5GC network failed over 3GPP access due to the Service option not being supported. FIG. 10 illustrates the example message flow in an instance in which the UE re-attempts PDU session establishment in the 5GC network over the non-3GPP access in a different PLMN after the re-attempt triggering criteria is satisfied. FIG. 11 shows the example message flow in an instance in which the UE re-attempts PDU session establishment in the 5GC network over the non-3GPP access in the same PLMN after the re-attempt triggering criteria is satisfied.

According to FIG. 9, after the UE has registered to the 5G core network in 901, the UE initiates a PDU Session Establishment procedure by sending a NAS message to the AMF encapsulating a PDU Session Establishment Request message with the PDU session type set to "Ethernet" within the N1 SM container in 902. In an example embodiment, the AMF performs SMF selection 903 and initiates a Nsmf_PDUSession_CreateSMContext Request towards the selected SMF, indicating the requested data connection type to be "Ethernet" 904.

In this case, the Ethernet PDU session is not supported by the selected SMF 905. Therefore, in 906, the SMF rejects the UE's request for Ethernet PDU session establishment by sending a Nsmf_PDUSession_CreateSMContext Response message towards the AMF, indicating the rejection cause as "Service option not supported". In addition, the SMF includes a re-attempt Indicator IE indicating that the UE is allowed to re-attempt the procedure in another access type.

In an example embodiment, the AMF initiates a Downlink NAS Transport procedure 907 to forward the PDU session reject message to the UE including the rejection cause "Service option not supported" and the re-attempt Indicator IE.

Following the response rejection described above and as shown in FIG. 9, upon receiving PDU session reject message from the AMF indicating the rejection cause as the "Service option not supported", the UE proceeds by first applying a retry restriction 908 based on a received backoff timer value and the re-attempt indicator. In this regard, the UE starts the back-off timer with the value provided in the Back-off timer value IE or with a preconfigured value. The retry restriction lasts until retry triggering criteria has been satisfied; and if the requested PDU session type is "Ethernet" and if the request was sent via 3GPP access, the UE is configured to perform access network selection over a non-3GPP access, such as by attempting to establish an IKEv2 SA (internet key exchange (IKE) version 2 security association (SA)) tunnel and initiating registration via the non-3GPP access.

In circumstances in which the registration is successful and the UE is registered over different PLMN as shown in 1001 in FIG. 10, the UE may be configured to re-attempt the PDU Session Establishment procedure by sending an NAS message 1002 to the new AMF encapsulating a PDU Session Establishment Request message with the PDU session type set to "Ethernet" within the N1 SM container as shown in FIG. 10 and the AMF is configured to select the SMF 1003 based on the operator configuration, access type, UE roaming status and whether local breakout or home routing is used.

In circumstances in which the registration is successful and the UE is registered over the same PLMN as shown in 1101 in FIG. 11 and in an instance in which the re-attempt Indicator indicates that the UE is allowed to re-attempt the procedure in another access type, the UE is configured to re-attempt the PDU Session Establishment procedure by sending a NAS message 1102 to the AMF encapsulating a PDU Session Establishment Request message with the PDU session type set to "Ethernet" within the N1 SM container. The AMF is configured to select the SMF based on operator configuration, access type, UE roaming status and whether local breakout or home routing is used as shown.

In circumstances in which the re-attempt indicator indicates that the UE is not allowed to re-attempt the procedure in other access types, the UE is configured to apply the retry restriction and will not re-attempt the PDU session establishment request over 3GPP nor non-3GPP access until the retry triggering criteria has been satisfied. In another example embodiment, in circumstances in which the requested PDU session type is "Ethernet" and in an instance in which the request was sent via non-3GPP access, the UE may be configured to initiate registration via 3GPP access if not already registered.

In circumstances in which the registration is successful and the UE is registered over different PLMN, the UE of an example embodiment is configured to re-attempt the PDU Session Establishment procedure by sending NAS message 1002 of FIG. 10 to the new AMF encapsulating a PDU Session Establishment Request message with the PDU session type set to "Ethernet" within the N1 SM container and the AMF is configured to select the SMF based on operator configuration, access type, UE roaming status and whether local breakout or home routing is used.

Additionally or alternatively, in circumstances in which the registration is successful and the UE is registered over the same PLMN, in an instance in which the re-attempt Indicator indicates that the UE is allowed to re-attempt the procedure in other access type and the backoff timer for the 3GPP access is not running 1104, the UE is configured to re-attempt the PDU Session Establishment procedure by sending a NAS message 1102 to the AMF encapsulating a PDU Session Establishment Request message with the PDU session type set to "Ethernet" within the N1 SM container. The AMF selects SMF based on operator configuration, access type, UE roaming status and whether local breakout or home routing is used 1103.

In another example embodiment, if the re-attempt indicator indicates that the UE is not allowed to re-attempt the procedure in another access type and the backoff timer for the 3GPP access is running, the UE is configured to apply retry restriction and does not re-attempt the PDU session establishment request over 3GPP nor non-3GPP access until the retry triggering criteria specified has been satisfied.

The criterion for re-attempt may be one of the following: a backoff timer expires; the UE re-attempts a PDU SESSION ESTABLISHMENT REQUEST message via another access type of the same PLMN and the re-attempt indicator IE from the AMF indicates that the UE is allowed to re-attempt the procedure in the other access type; the UE re-attempts the PDU SESSION ESTABLISHMENT REQUEST message via another access type of a different PLMN; the UE re-attempts the PDU SESSION ESTABLISHMENT REQUEST message for an Ethernet PDU session type using a different [DNN, S-NSSAI] combination; the UE re-attempts the PDU SESSION ESTABLISHMENT REQUEST message in S1 mode towards the evolved packet core (EPC) and the re-attempt indicator IE indicates that the UE is allowed to re-attempt the procedure in S1 mode; the UE is registered to a different PLMN which was not in the list of equivalent PLMNs at the time when the PDU SESSION ESTABLISHMENT REJECT message was received; the UE is registered to a different PLMN which was in the list of equivalent PLMNs at the time when the PDU SESSION ESTABLISHMENT REJECT message was received, and the re-attempt indicator IE indicates that re-attempt in an equivalent PLMN is allowed; or the UE is switched off or the SIM or USIM is removed.

Figure 12:
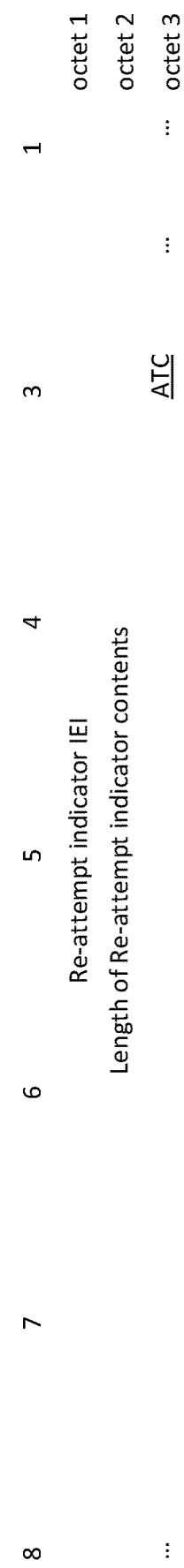
FIG. 12 depicts a re-attempt indicator.
Figure 13:
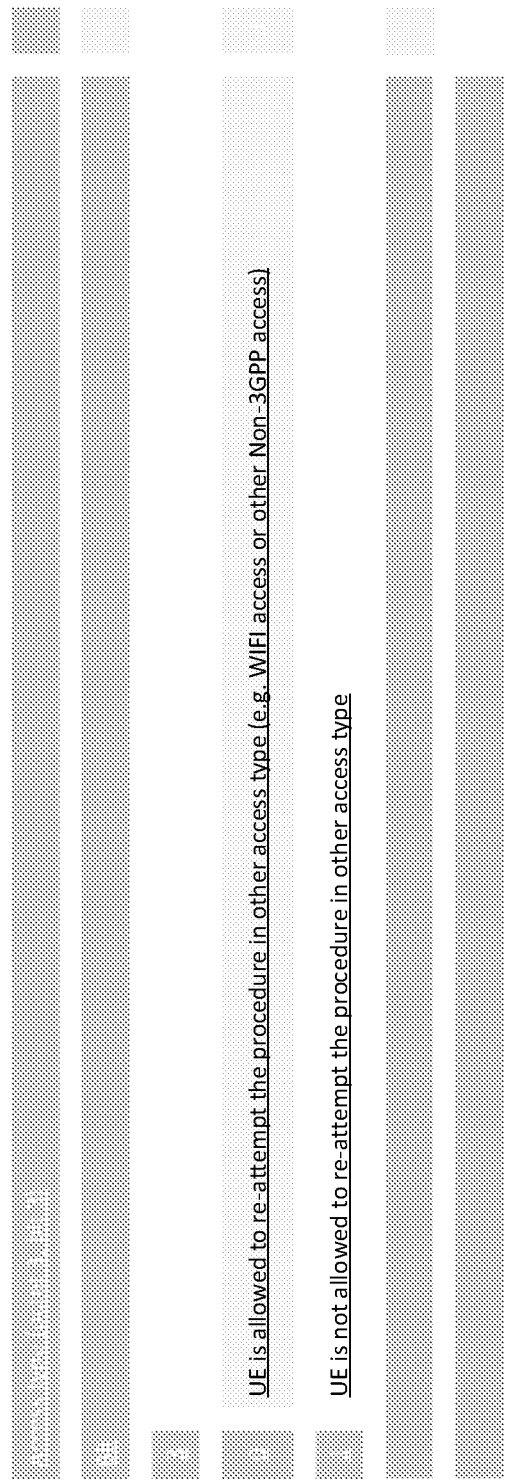
FIG. 13 depicts a re-attempt indicator and bit values.

At least one purpose of the re-attempt indicator information element is to indicate a condition under which the UE is allowed in the current PLMN for the same DNN, to re-attempt a session management procedure corresponding to the 5GS session management procedure which was rejected by the network. FIG. 12 illustrates one example of a re-attempt indicator IE that includes a re-attempt indicator IE identifier (IEI) in a first octet and the contents of the re-attempt indicator in a second octet. As shown in more detail in FIG. 13, the third octet of this example of a re-attempt indicator IE may include a bit that indicates the access type, such as by indicating that the UE is allowed to re-attempt the procedure in other access types, e.g., using an WiFi access or other non-3GPP access, in an instance in which the bit has a value of 1, and indicating that the UE is not allowed to attempt the procedures in another access type in an instance in which the it has a value of 0.

Figure 14:
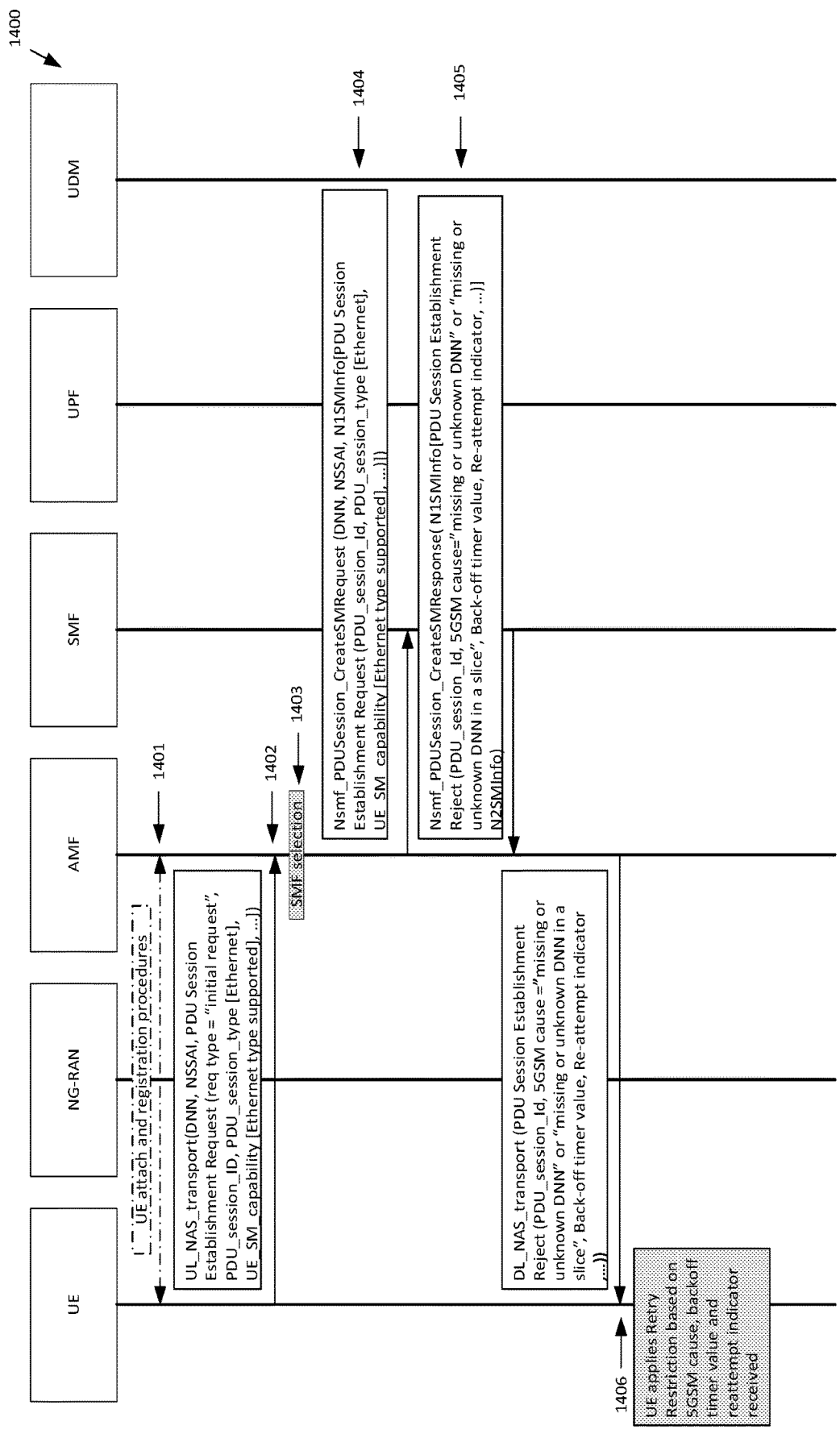
FIG. 14 illustrates operations performed, such as by the apparatus of FIG. 2 related to Ethernet PDU session establishment failure due to an unknown DNN.
Figure 15:
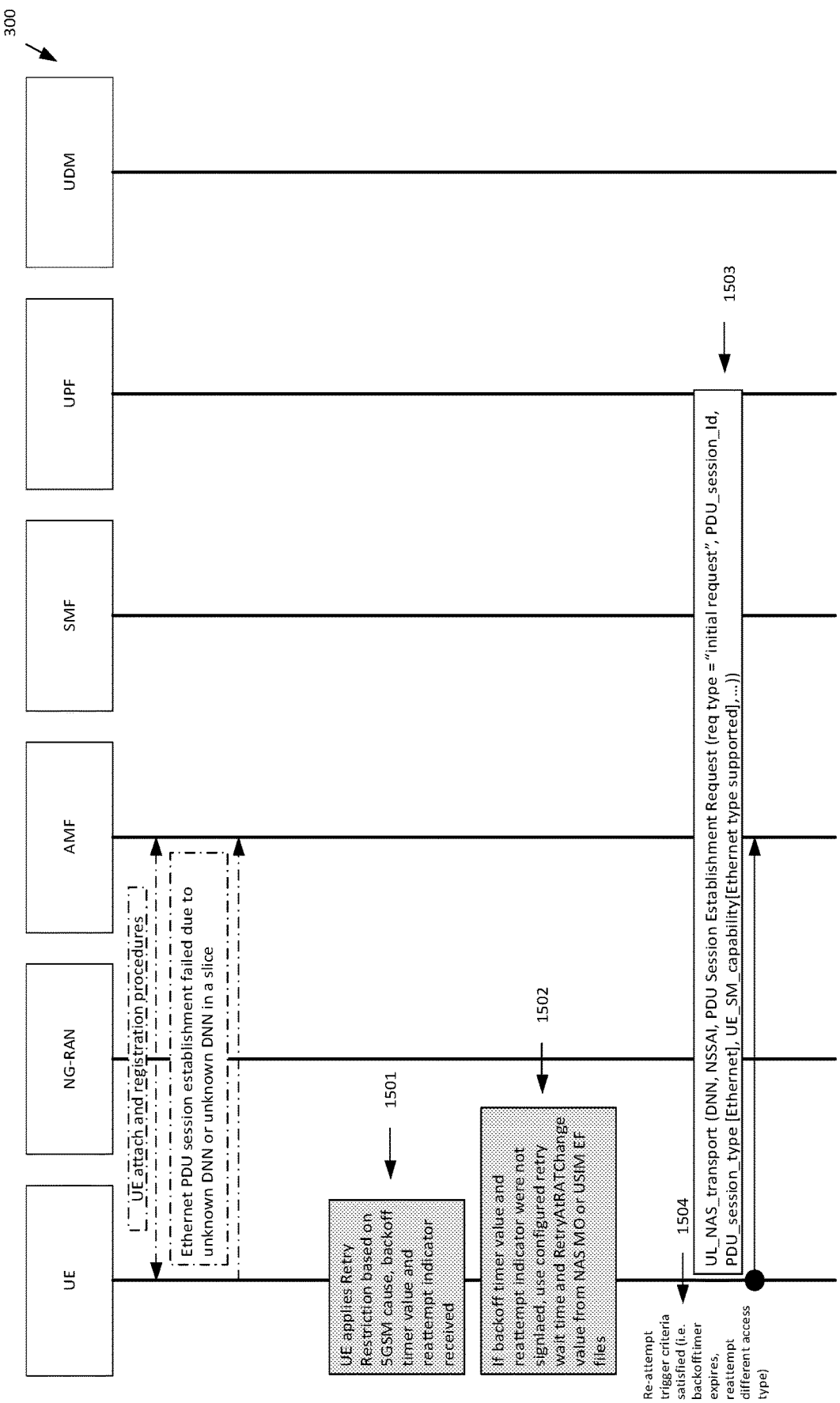
FIG. 15 illustrates operations performed, such as by the apparatus of FIG. 2 related to Ethernet data network connection establishment after retry restriction backoff.
Figure 16:
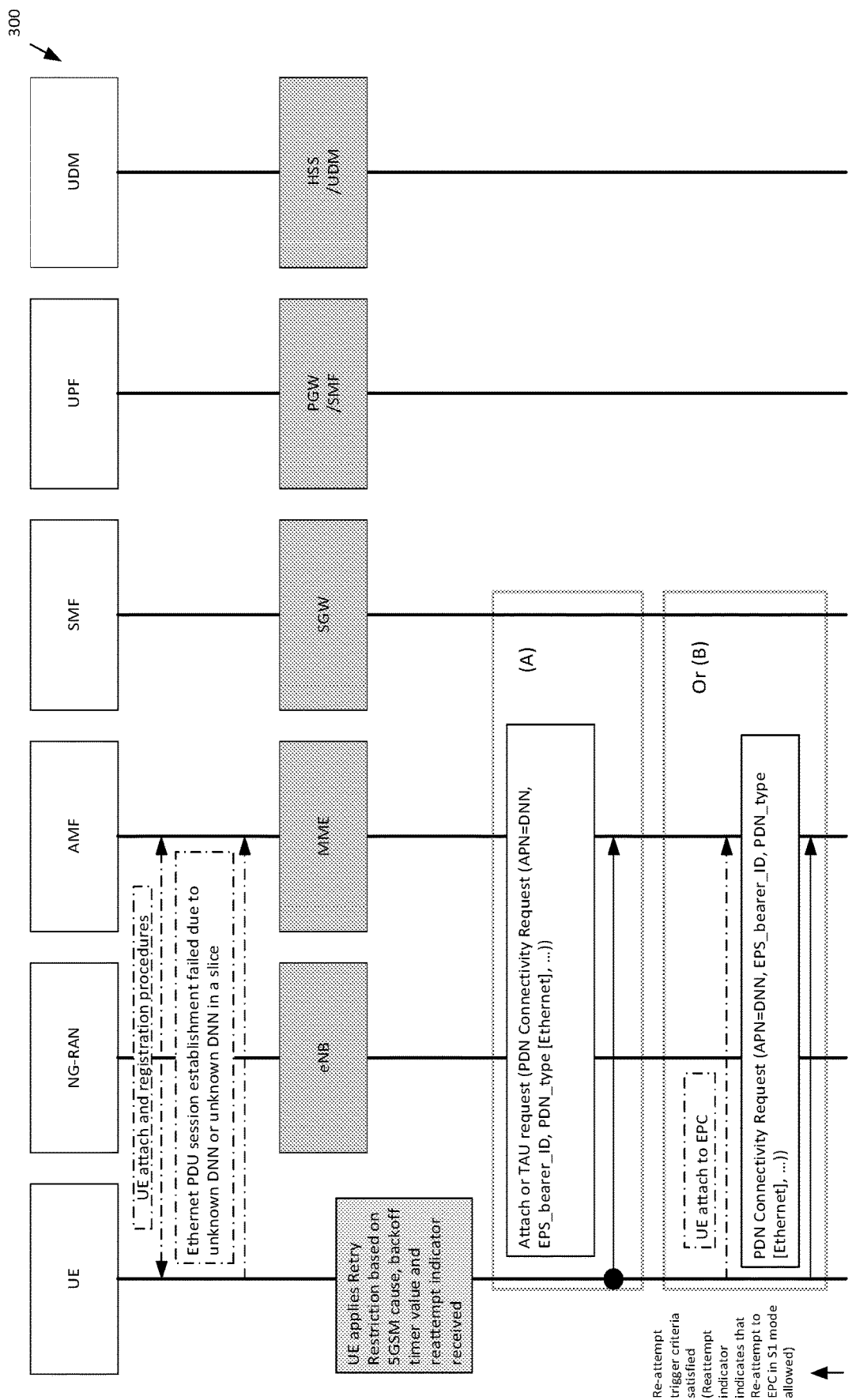
FIG. 16 illustrates operations performed, such as by the apparatus of FIG. 2 related to Ethernet data network connection establishment in circumstances when re-attempt via an Evolved Packet Core (EPC) is allowed.

D. Handling Failure of Ethernet Data Connection Establishment and Ethernet PDU Session Establishment Re-Attempt after Failure Due to an Unknown DNN FIG. 14 shows the example message flow 1400 in an instance in which Ethernet PDU session establishment in a 5GC network failed due to an unknown DNN or an unknown DNN in a slice. FIGS. 15 and 16 show the example message flow in an instance in which the UE re-attempts PDU session establishment in the 5GC network after the re-attempt triggering criteria is satisfied.

For example, and according to operations illustrated in FIG. 14, after the UE has registered to the 5G core network 1401, the UE is configured to initiate a PDU Session Establishment procedure 1402 by sending a NAS message to the AMF encapsulating a PDU Session Establishment Request message with the PDU session type set to "Ethernet" within the N1 SM container. The AMF may then perform SMF selection 1403 and initiate a Nsmf_PDUSession_CreateSMContext Request towards the selected SMF, indicating the requested data connection type to be "Ethernet" as shown in 1404.

In an example embodiment, the DNN included in the PDU session establishment request is unknown to the SMF. As such, the SMF rejects the UE's request for Ethernet PDU session establishment by sending a Nsmf_PDUSession_CreateSMContext Response message 1405 towards the AMF, indicating the rejection cause as "Missing or unknown DNN" or "Missing or unknown DNN in a slice". The AMF then initiates a Downlink NAS Transport procedure 1406 to forward the PDU session reject message to the UE including the rejection cause "Missing or unknown DNN" or "Missing or unknown DNN in a slice".

As illustrated in FIGS. 15 and 16, upon receiving the PDU session reject message from the AMF indicating the rejection cause as "Missing or unknown DNN" or "Missing or unknown DNN in a slice", the UE applies retry restriction based on a received backoff timer value and re-attempt indicator 1501. In circumstances such as in 1502 in which the timer value indicates neither zero nor deactivated, the UE starts the back-off timer with the value provided in the Back-off timer value IE for the PDU session establishment procedure and does not send another PDU SESSION ESTABLISHMENT REQUEST message 1503 for the same DNN and S-NSSAI in the current PLMN, until the retry triggering criteria has been satisfied 1504.

In circumstances in which the timer value indicates that this timer is deactivated, the UE does not send another PDU SESSION ESTABLISHMENT REQUEST message for the same DNN and S-NSSAI in the current PLMN, until the UE is switched off or the SIM or USIM is removed or in circumstances in which the timer value indicates zero, the UE may send another PDU SESSION ESTABLISHMENT REQUEST message for the same combination of [PLMN, DNN, S-NSSAI] in the current PLMN. In another example embodiment, if the Back-off timer value IE is not included, then the UE shall ignore the re-attempt indicator IE provided by the network in the PDU SESSION ESTABLISHMENT REJECT message. If the UE is registered in the Home PLMN (HPLMN) or in a PLMN that is within the Equivalent HPLMN (EHPLMN) list, then the UE is configured to use the configured SM Retry Wait Time value from the NAS MO or in the USIM file EF$_{NASCONFIG}$ as the back-off timer value.

Alternatively, the UE is configured to use the configured SM Retry Wait Time value from the NAS MO or in the USIM file EF$_{NASCONFIG}$ as the back-off timer value if the re-attempt indicator IE is included in the PDU session reject message. In another example embodiment, if the UE is not registered in its HPLMN or in a PLMN that is within the EHPLMN list, or if the SM Retry Wait Time value is not configured, the UE can proceed by using the default value of a predetermined duration, such as 12 minutes, for the back-off timer.

Alternatively, the UE can proceed by using a pre-determined default value (e.g., 12 minutes) for the back-off timer if the re-attempt indicator IE is included in the PDU session reject message. The UE is further configured to not send another PDU SESSION ESTABLISHMENT REQUEST message in the PLMN for the same DNN that was sent by the UE, until the UE is switched off, the SIM or USIM is removed, or the DNN is included in the LADN information and the network updates the LADN information during the registration procedure or the generic UE configuration update procedure if the re-attempt indicator IE is not included and the 5GSM cause value indicates a "missing or unknown DNN".

Additionally or alternatively, the UE may be configured to not send another PDU SESSION ESTABLISHMENT REQUEST message in the PLMN for the same DNN and the same S-NSSAI associated with (if available in roaming scenarios) a mapped S-NSSAI that were sent by the UE, or for the same DNN and no S-NSSAI if the S-NSSAI was not sent by the UE, until the UE is switched off, the SIM or USIM is removed, or the DNN is included in the LADN information and the network updates the LADN information during the registration procedure or the generic UE configuration update procedure if the re-attempt indicator IE is not included and the 5GSM cause value indicates a "missing or unknown DNN in a slice".

In another example embodiment, if the requested PDU session type is "Ethernet", the UE attempts for PDU session establishment over the other access can be handled in the same way as specified in section C above.

Accordingly, re-attempt triggering criteria may include one of the following: backoff timer expires; the UE re-attempts the PDU SESSION ESTABLISHMENT REQUEST message via another access type of the same PLMN and the re-attempt indicator IE from the AMF indicates that the UE is allowed to re-attempt the procedure in another access type; the UE re-attempts the PDU SESSION ESTABLISHMENT REQUEST message via an other access type of a different PLMN; the UE re-attempts the PDU SESSION ESTABLISHMENT REQUEST message for the Ethernet PDU session type using a different [DNN, S-NSSAI] combination; the UE re-attempts the PDU SESSION ESTABLISHMENT REQUEST message in S1 mode as shown in 1601 of FIG. 16 towards the EPC and the re-attempt indicator IE indicates that the UE is allowed to re-attempt the procedure in S1 mode; the UE is registered to a different PLMN which was not in the list of equivalent PLMNs at the time when the PDU SESSION ESTABLISHMENT REJECT message was received; the UE is registered to a different PLMN which was in the list of equivalent PLMNs at the time when the PDU SESSION ESTABLISHMENT REJECT message was received, and the re-attempt indicator IE included in the PDU SESSION ESTABLISHMENT REJECT message indicates that re-attempt in an equivalent PLMN is allowed; or the UE is switched off or the SIM or USIM is removed.

According to section 6.4.1.4.3 in 3GPP standards document, if the 5GSM cause value is #8 "operator determined barring", #32 "service option not supported", or #33 "requested service option not subscribed", the UE shall proceed as according to the details disclosed in the 3GPP standards. In addition, the present disclosure includes cause value #27 "missing or unknown DNN" and #70 "missing or unknown DNN in a slice" to the list.

According to the same section 6.4.1.4.3 of the 3GPP standards document use of the default value of 12 minutes for the back-off time in cases when the Re-attempt indicator IE is included or the Re-attempt indicator IE is not included and the 5GSM cause value is #8 "operator determined barring", #32 "service option not supported" or #33 "requested service option not subscribed".

In the same section 6.4.1.4.3 of this 3GPP document, the UE shall be further configured to not send another PDU SESSION ESTABLISHMENT REQUEST message in the PLMN for the same DNN that was sent by the UE, until the UE is switched off, the USIM is removed, or the DNN is included in the LADN information and the network updates the LADN information during the registration procedure or the generic UE configuration update procedure if the Re-attempt indicator IE is not included and the 5GSM cause value is #27 "missing or unknown DNN".

In another example embodiment, the UE shall be further configured to not send another PDU SESSION ESTABLISHMENT REQUEST message in the PLMN for the same DNN and the same S-NSSAI associated with (if available in roaming scenarios), a mapped S-NSSAI that were sent by the UE, or for the same DNN and no S-NSSAI if S-NSSAI was not sent by the UE, until the UE is switched off, the USIM is removed, or the DNN is included in the LADN information and the network updates the LADN information during the registration procedure or the generic UE configuration update procedure if the Re-attempt indicator IE is not included and the 5GSM cause value is #70 "missing or unknown DNN in a slice". In another example embodiment, the UE behaviour regarding the start of a back-off timer is unspecified for 5GSM cause values different from #8 "operator determined barring", #27 "missing or unknown DNN", #32 "service option not supported", #33 "requested service option not subscribed" or #70 "missing or unknown DNN in a slice".

In yet another example embodiment, for the 5GSM cause value #8 "operator determined barring", #27 "missing or unknown DNN", #32 "service option not supported", #33 "requested service option not subscribed" or #70 "missing or unknown DNN in a slice", if the network does not include a Re-attempt indicator IE, the UE may decide not to automatically send another PDU SESSION ESTABLISHMENT REQUEST message for the same combination of [PLMN, DNN, S-NSSAI], [PLMN, DNN, no S-NSSAI], [PLMN, no DNN, S-NSSAI], or [PLMN, no DNN, no S-NSSAI] using the same PDU session type if the UE is registered to a new PLMN which is in the list of equivalent PLMNs. According to the 3GPP standards, the UE is registered to the new PLMN which was in the list of equivalent PLMNs at the time when the PDU SESSION ESTABLISHMENT REJECT message was received, and either the network did not include a re-attempt indicator IE in the PDU SESSION ESTABLISHMENT REJECT message or the re-attempt indicator IE included in the message indicated that re-attempt in an equivalent PLMN is allowed.

Per the 3GPP standards, the 5GSM cause values include #50 "PDU session type IPv4 only allowed", #51 "PDU session type IPv6 only allowed", #57 "PDU session type IPv4v6 only allowed" or #58 "PDU session type Unstructured only allowed" or #61 "PDU session type Ethernet only allowed." If the network did not include a re-attempt indicator IE in the PDU SESSION ESTABLISHMENT REJECT message, the UE may decide not to automatically send another PDU SESSION ESTABLISHMENT REQUEST message for the same DNN that was sent by the UE using the same PDU session type, if the UE is registered to a new PLMN which was in the list of equivalent PLMNs.

E. Handling Failure of Unstructured Data Connection Establishment and Unstructured PDU Session Establishment Re-Attempt Over Another Access Type in the Same or Different PLMN after Failure Due to a Service Option not being Supported Over One Access Type In an example embodiment, the UE and network behavior for handling the failure of an unstructured data connection establishment and a PDU session establishment re-attempt after failure due to a service option not being supported may be the same as described above in Section C with the PDU session type included in the initial and re-attempted PDU Session Establishment Request message set to "Unstructured" within the N1 SM container.

For example, upon receiving PDU session reject message from the AMF indicating the rejection cause as the "Service option not supported", the UE proceeds by first applying a retry restriction based on a received backoff timer value and the re-attempt indicator. In this regard, the UE starts the back-off timer with the value provided in the Back-off timer value IE or with a preconfigured value. The retry restriction lasts until retry triggering criteria has been satisfied; and if the requested PDU session type is "Unstructured" and if the request was sent via 3GPP access, the UE is configured to perform access network selection over a non-3GPP access, such as by attempting to establish an IKEv2 SA (internet key exchange (IKE) version 2 security association (SA)) tunnel and initiating registration via the non-3GPP access.

In circumstances in which the registration is successful and the UE is registered over a different PLMN, the UE may be configured to re-attempt the PDU Session Establishment procedure by sending an NAS message to the new AMF encapsulating a PDU Session Establishment Request message with the PDU session type set to "Unstructured" within the N1 SM container and the AMF is configured to select the SMF based on the operator configuration, access type, UE roaming status and whether local breakout or home routing is used.

In circumstances in which the registration is successful and the UE is registered over the same PLMN and in an instance in which the re-attempt Indicator indicates that the UE is allowed to re-attempt the procedure in another access type, the UE is configured to re-attempt the PDU Session Establishment procedure by sending a NAS message to the AMF encapsulating a PDU Session Establishment Request message with the PDU session type set to "Unstructured" within the N1 SM container. The AMF is configured to select the SMF based on operator configuration, access type, UE roaming status and whether local breakout or home routing is used. In circumstances in which the re-attempt indicator indicates that the UE is not allowed to re-attempt the procedure in other access types, the UE is configured to apply the retry restriction and will not re-attempt the PDU session establishment request over 3GPP nor non-3GPP access until the retry triggering criteria has been satisfied. In another example embodiment, in circumstances in which the requested PDU session type is "Unstructured" and in an instance in which the request was sent via non-3GPP access, the UE may be configured to initiate registration via 3GPP access if not already registered.

In circumstances in which the registration is successful and the UE is registered over different PLMN, the UE of an example embodiment is configured to re-attempt the PDU Session Establishment procedure by sending NAS message to the new AMF encapsulating a PDU Session Establishment Request message with the PDU session type set to "Unstructured" within the N1 SM container and the AMF is configured to select the SMF based on operator configuration, access type, UE roaming status and whether local breakout or home routing is used. Additionally or alternatively, in circumstances in which the registration is successful and the UE is registered over the same PLMN, in an instance in which the re-attempt Indicator indicates that the UE is allowed to re-attempt the procedure in other access type and the backoff timer for the 3GPP access is not running, the UE is configured to re-attempt the PDU Session Establishment procedure by sending a NAS message to the AMF encapsulating a PDU Session Establishment Request message with the PDU session type set to "Unstructured" within the N1 SM container. The AMF selects SMF based on operator configuration, access type, UE roaming status and whether local breakout or home routing is used.

In another example embodiment, if the re-attempt Indicator indicates that the UE is not allowed to re-attempt the procedure in another access type and the backoff timer for the 3GPP access is running, the UE is configured to apply retry restriction and does not re-attempt the PDU session establishment request over 3GPP nor non-3GPP access until the retry triggering criteria specified has been satisfied.

F. Handling Failure of Unstructured Data Connection Establishment and Unstructured PDU Session Establishment Re-Attempt after Failure Due to an Unknown DNN UE and network behavior for handling the failure of unstructured data connection establishment and the PDU session establishment re-attempt after failure due to an unknown DNN or unknown DNN in a slice may be the same as described above in section D above with the PDU session type included in the initial and re-attempted PDU Session Establishment Request message set to "Unstructured" within the N1 SM container.

For example, upon receiving the PDU session reject message from the AMF indicating the rejection cause as "Missing or unknown DNN" or "Missing or unknown DNN in a slice", the UE applies retry restriction based on a received backoff timer value and re-attempt indicator. In circumstances in which the timer value indicates neither zero nor deactivated, the UE starts the back-off timer with the value provided in the Back-off timer value IE for the PDU session establishment procedure and does not send another PDU SESSION ESTABLISHMENT REQUEST message for the same DNN and S-NSSAI in the current PLMN, until the retry triggering criteria has been satisfied. In circumstances in which the timer value indicates that this timer is deactivated, the UE does not send another PDU SESSION ESTABLISHMENT REQUEST message for the same DNN and S-NSSAI in the current PLMN, until the UE is switched off or the SIM or USIM is removed or in circumstances in which the timer value indicates zero, the UE may send another PDU SESSION ESTABLISHMENT REQUEST message for the same combination of [PLMN, DNN, S-NSSAI] in the current PLMN.

In another example embodiment, if the Back-off timer value IE is not included, then the UE shall ignore the re-attempt indicator IE provided by the network in the PDU SESSION ESTABLISHMENT REJECT message. If the UE is registered in the Home PLMN (HPLMN) or in a PLMN that is within the Equivalent HPLMN (EHPLMN) list, then the UE is configured to use the configured SM Retry Wait Time value from the NAS MO or in the USIM file $EF_{NASCONFIG}$ as the back-off timer value. Alternatively, the UE is configured to use the configured SM Retry Wait Time value from the NAS MO or in the USIM file $EF_{NASCONFIG}$ as the back-off timer value if the re-attempt indicator IE is included in the PDU session reject message. In another example embodiment, if the UE is not registered in its HPLMN or in a PLMN that is within the EHPLMN list, or if the SM Retry Wait Time value is not configured, the UE can proceed by using the default value of a predetermined duration, such as 12 minutes, for the back-off timer.

Alternatively, the UE can proceed by using a pre-determined default value (e.g., 12 minutes) for the back-off timer if the re-attempt indicator IE is included in the PDU session reject message. The UE is further configured to not send another PDU SESSION ESTABLISHMENT REQUEST message in the PLMN for the same DNN that was sent by the UE, until the UE is switched off, the SIM or USIM is removed, or the DNN is included in the LADN information and the network updates the LADN information during the registration procedure or the generic UE configuration update procedure if the re-attempt indicator IE is not included and the 5GSM cause value indicates a "missing or unknown DNN".

Additionally or alternatively, the UE may be configured to not send another PDU SESSION ESTABLISHMENT REQUEST message in the PLMN for the same DNN and the same S-NSSAI associated with (if available in roaming scenarios) a mapped S-NSSAI that were sent by the UE, or for the same DNN and no S-NSSAI if the S-NSSAI was not sent by the UE, until the UE is switched off, the SIM or USIM is removed, or the DNN is included in the LADN information and the network updates the LADN information during the registration procedure or the generic UE configuration update procedure if the re-attempt indicator IE is not included and the 5GSM cause value indicates a "missing or unknown DNN in a slice".

In another example embodiment, the UE and network behavior for handling a re-attempt over a different non-3GPP access type (e.g., WIFI, fixed trusted access, MuLte-Fire, etc.) after failure over one non-3GPP access type due to the service option not being supported or due to an unknown DNN or unknown DNN in a slice may be the same as described above in sections C and D, respectively, except the UE is to perform access network selection and to initiate registration over a different non-3GPP access type before re-attempting the PDU Session Establishment Request procedure for a PDU session type.

Figure 17:
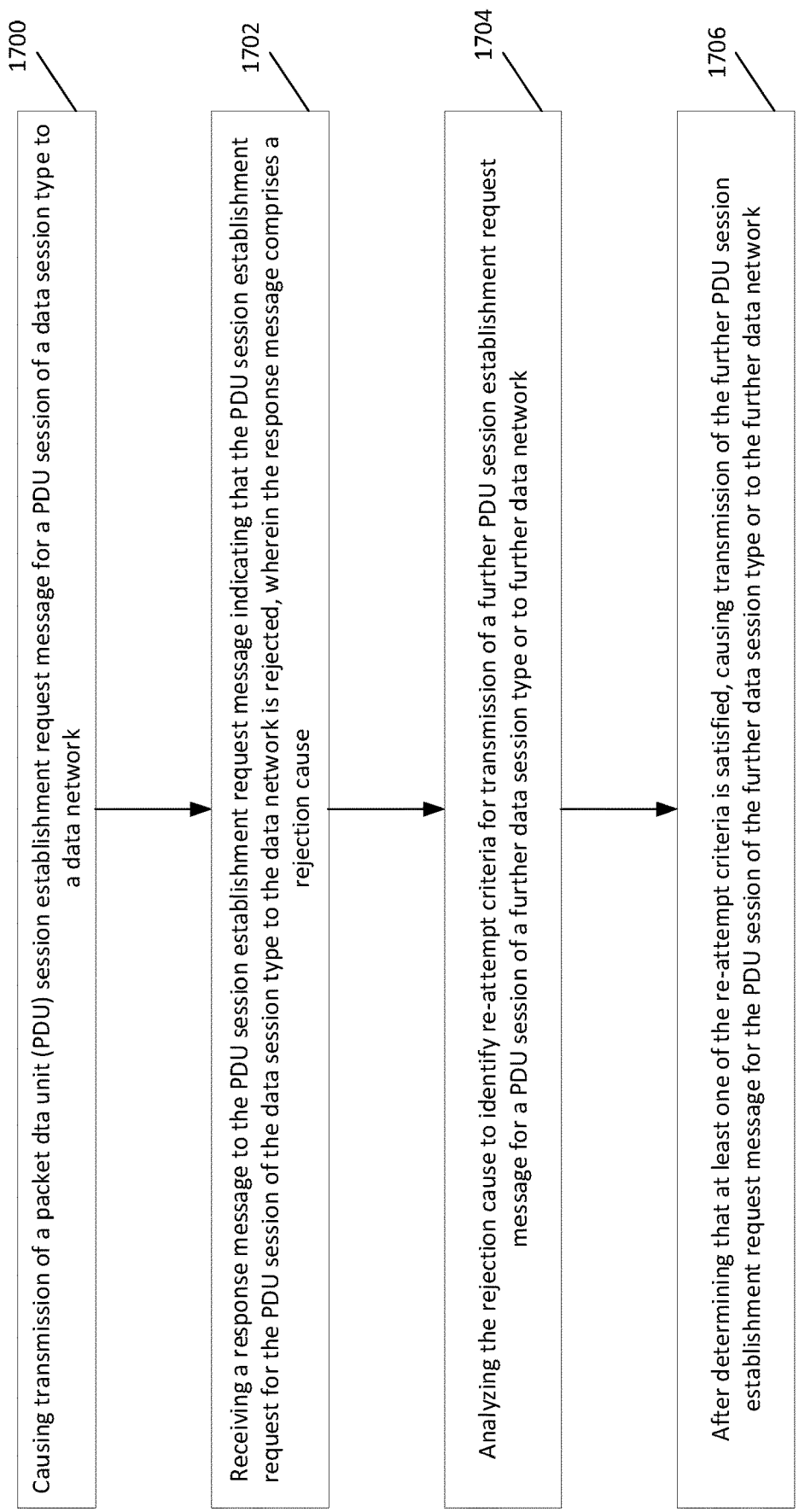
FIGS. 17 and 18 are flowcharts illustrating workflows of various components of a communication system in accordance with an example embodiment.

The operations performed by the apparatus 20 embodied by the UE are depicted in a flowchart of FIG. 17. As shown by block 1700, the apparatus includes means, such as the processor 22, the communication interface 26 or the like, for causing transmission of a packet data unit (PDU) session establishment request message for a PDU session of a data session type to a data network.

In an example embodiment, the UE initiates the PDU session establishment procedure by sending a NAS message to the AMF encapsulating a PDU session establishment request message with the PDU session type set to "Ethernet" within the N1 SM container. In another example embodiment, the UE initiates the PDU session establishment procedure by sending a NAS message to the AMF encapsulating a PDU session establishment request message with the PDU session type set to "Unstructured" within the N1 SM container.

As shown in Block 1702, the apparatus of this example embodiment includes means, such as the processor 22, the communication interface 26 or the like, for receiving a response message to the PDU session establishment request message indicating that the PDU session establishment request for the PDU session of the data session type to the data network is rejected, wherein the response message comprises a rejection cause.

In an example embodiment, the rejection cause indicates that only an unstructured type of PDU session type is allowed, only an Ethernet type of PDU session type is allowed, a service option is not supported, or a data network name (DNN) is unknown. By way of example, but not of limitation, the rejection causes may include the following: Cause #57—PDU session type IPv4v6 only allowed, wherein this 5GSM cause is used by the network to indicate that only PDU session types IPv4, IPv6 or IPv4v6 are allowed for the requested IP connectivity; Cause #58—PDU session type Unstructured only allowed, wherein this 5GSM cause is used by the network to indicate that only PDU session type Unstructured is allowed for the requested DN connectivity; Cause #61—PDU session type Ethernet only allowed, wherein this 5GSM cause is used by the network to indicate that only PDU session type Ethernet is allowed for the requested DN connectivity. As will be noted, the cause numbers are provided by way of designation, but the respective causes may be differently designated in other embodiments. By way of one example, however, these additional causes may be included in the list of causes, such as provided by the section 9.11.4.2 of the 3GPP standard as follows:

| Cause value (octet 2) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 1 | 1 | 1 | 0 | 0 | 1 | PDU session type IPv4v6 only allowed |
| 0 | 0 | 1 | 1 | 1 | 0 | 1 | 0 | PDU session type Unstructured only allowed |
| 0 | 0 | 1 | 1 | 1 | 1 | 0 | 1 | PDU session type Ethernet only allowed |

In an example embodiment, the apparatus includes means, such as the processor 202, the communication interface 208 or the like, for analyzing the rejection cause to identify re-attempt criteria for transmission of a further PDU session establishment request message for a PDU session of a further data session type or to a further data network as shown by block 1704.

As shown in block 1706, the apparatus of this example embodiment includes means, such as the processor 22, the communication interface 26 or the like, for after determining that at least one of the re-attempt criteria is satisfied, causing transmission of the further PDU session establishment request message for the PDU session of the further data session type or to the further data network. In an example embodiment, if the rejection cause indicates the data session type to the data network is not supported, a supported data session type to the data network is only an unstructured type, the supported data session type to the data network is only an Ethernet type, or the data network is not accessible.

In an example embodiment, the PDU session of the data session type to the data network is not the Ethernet type and the rejection cause indicates that only the Ethernet type is supported. Additionally, or alternatively, the PDU session of the data session type to the data network is not the unstructured type and the rejection cause indicates that only the unstructured type is supported. In another example embodiment, the PDU session of the data session type to the data network is not an internet protocol (IP) type and the rejection cause indicates that only the IP type is supported. In another example embodiment, the PDU session of the data session type to the data network is the Ethernet type and the rejection cause indicates that a service option is not supported over the Ethernet type. In yet another example embodiment, the PDU session of the data session type to the data network is the Ethernet type and the rejection cause indicates that the data network of the Ethernet type is not accessible in a current network. The PDU session is transmitted over 3rd generation partnership project (3GPP) access type. In another example embodiment, the PDU session is transmitted over non-3rd generation partnership project (non-3GPP) access type, wherein the non-3GPP access type comprises Wi-Fi access, wireline access, or MuLteFire.

In circumstances when the re-attempt criteria associated with the rejection cause indicates that only the unstructured type of PDU session is supported, the criterion that is satisfied in an instance in which (a) a user equipment (UE) initiates the further PDU session establishment request message for a different PDU session type, wherein the different PDU session type is not Ethernet or internet protocol (IP) session type, (b) the UE is registered to a different Public land mobile network (PLMN) which was not in a list of equivalent PLMNs at the time when the PDU session establishment request message for the Ethernet or IP session type was transmitted, (c) the UE is registered to the different PLMN which was in the list of equivalent PLMNs at the time when the rejection response to the PDU session request message for the Ethernet or IP session type was received and a re-attempt indicator included in the rejection response to the PDU session request message indicated that re-attempt in an equivalent PLMN is allowed, or (d) the UE associated with the further PDU session establishment request message for the Ethernet or IP session type is switched off or a subscriber identity module (SIM) or a universal subscriber identity module (USIM) is removed.

In yet another example embodiment, the re-attempt criteria associated with the rejection cause indicating that only an Ethernet type of PDU session is supported comprises criterion that is satisfied in an instance in which (a) a user equipment (UE) initiates the further PDU session establishment request message for a different PDU session type, wherein the different PDU session type is not unstructured or internet protocol (IP) session type, (b) the UE is registered to the different PLMN which was not in the list of equivalent PLMNs at the time when the PDU session establishment request message for the unstructured or IP session type was transmitted, (c) the UE is registered to the different PLMN which was in the list of equivalent PLMNs at the time when the rejection response to the PDU session request message for the unstructured or IP session type was received and the re-attempt indicator included in the rejection response to the PDU session request message indicated that re-attempt in an equivalent PLMN is allowed, or (d) the UE associated with the further PDU session establishment request message for the unstructured or IP session type is switched off or subscriber identity module (SIM) or a universal subscriber identity module (USIM) is removed.

In yet another example embodiment, the re-attempt criteria associated with the rejection cause indicating that only the IP type of PDU session is supported comprises criterion that is satisfied in an instance in which (a) a user equipment (UE) initiates the further PDU session establishment request message for a different PDU session type, wherein the different PDU session type is not unstructured or Ethernet session type, (b) the UE is registered to a different PLMN which was not in the list of equivalent PLMNs at the time when the PDU session establishment request message for the unstructured or Ethernet session type was transmitted, (c) the UE is registered to the different PLMN which was in the list of equivalent PLMNs at the time when the rejection response to the PDU session request message for the unstructured or Ethernet session type was received and the re-attempt indicator included in the rejection response to the PDU session request message indicated that re-attempt in an equivalent PLMN is allowed, or (d) the UE associated with the further PDU session establishment request message for the unstructured or Ethernet session type is switched off or subscriber identity module (SIM) or a universal subscriber identity module (USIM) is removed.

In another example embodiment, in circumstances when a re-attempt indicator indicates support for another 3GPP access type and a backoff timer for a non-3GPP access type is not running, the apparatus of this example embodiment includes means, such as the processor 22, the communication interface 26 or the like, for causing the transmission of the further PDU session establishment message over the another 3GPP access type.

In yet another example embodiment, in circumstances when a re-attempt indicator indicates support for another non-3GPP access type and a backoff timer for a 3GPP access type is not running, the apparatus of this example embodiment includes means, such as the processor 22, the communication interface 26 or the like, for causing the transmission of the further PDU session establishment message over the another non-3GPP access type. In circumstances when the backoff timer for the 3GPP access type is not running in N1 mode, the apparatus is further configured to cause the transmission of the further PDU session establishment message over the 3GPP access type in N1 mode. In the example embodiment, the backoff timer value for the 3GPP access type or the non-3GPP access type is set according to a timer value included in the response message to the PDU session establishment request message. Additionally, or alternatively, wherein in circumstances when the response message to the PDU session establishment request message does not include the timer value, using a pre-configured value from a configured switching module (SM) retry wait time value as the back-off timer value, wherein the SM retry wait time value is derived from a non-access stratum (NAS) management object or configuration data in the USIM.

In another example embodiment, the re-attempt criteria associated with the rejection cause indicating that the service option is not supported comprises criterion that is satisfied in an instance in which (a) a user equipment (UE) is registered to a different PLMN which was not in the list of equivalent PLMNs at the time when the PDU session establishment request message was transmitted, (b) the UE is registered to the different PLMN which was in the list of equivalent PLMNs at the time when the rejection response to the PDU session request message was received and the re-attempt indicator included in the rejection response to the PDU session request message indicated that re-attempt in an equivalent PLMN is allowed, (c) a backoff timer expires, (d) the UE re-attempts the further PDU session establishment request message via another PDU session type of a same PLMN and the re-attempt indicator from an Access and Mobility Management Function (AMF) indicated that the UE is allowed to re-attempt the PDU session request message in the another PDU session type, (e) the UE re-attempts the further PDU session establishment request message via another PDU session type of a different PLMN, (f) the UE re-attempts the further PDU session request message for a Ethernet PDU session type using a different DNN and/or single-network slice selection assistance information (S-NSSAI) combination, (g) the UE re-attempts the further PDU session request message for a packet data network (PDN) connection established in an evolved packet system (EPS) and the re-attempt indicator indicated that re-attempt to modify the PDU session corresponding to the PDN connection is allowed, or (h) the UE associated with the further PDU session establishment request message is switched off or subscriber identity module (SIM) or a universal subscriber identity module (USIM) is removed.

In another example embodiment, the re-attempt criteria associated with the rejection cause indicating the data network is not accessible comprises criterion that is satisfied in an instance in which (a) the user equipment (UE) is registered to a different PLMN which was not in the list of equivalent PLMNs at the time when the PDU session establishment request message was transmitted, (b) the UE is registered to the different PLMN which was in the list of equivalent PLMNs at the time when the rejection response to the PDU session request message was received and the re-attempt indicator included in the rejection response to the PDU session request message indicated that re-attempt in an equivalent PLMN is allowed, (c) the backoff timer expires, (d) the UE re-attempts the further PDU session establishment request message via another PDU session type of a same PLMN and the re-attempt indicator from an Access and Mobility Management Function (AMF) indicated that the UE is allowed to re-attempt the PDU session request message in the another PDU session type, (e) the UE re-attempts the further PDU session establishment request message via another PDU session type of a different PLMN, (f) the UE re-attempts the further PDU session request message for an Ethernet PDU session type using a different DNN and/or single-network slice selection assistance information (S-NSSAI) combination, (g) the UE re-attempts the further PDU session request message for a packet data network (PDN) connection established in an evolved packet system (EPS) and the re-attempt indicator indicated that re-attempt to modify the PDU session corresponding to the PDN connection is allowed, or (h) the UE associated with the further PDU session establishment request message is switched off or subscriber identity module (SIM) or a universal subscriber identity module (USIM) is removed.

Figure 18:
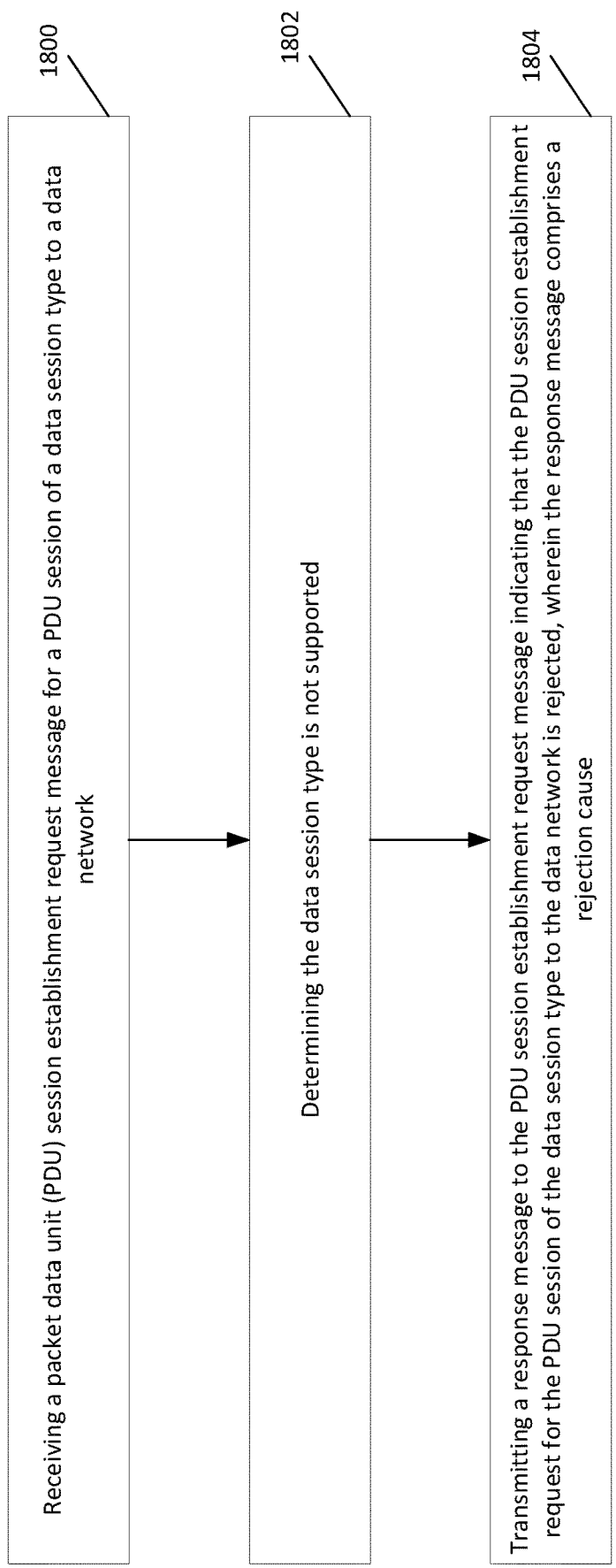

The operations performed by the apparatus 20 embodied by the session management function (SMF) are depicted in a flowchart of FIG. 18. As shown by block 1800, the apparatus includes means, such as the processor 22, the communication interface 26 or the like, for receiving a packet data unit (PDU) session establishment request message for a PDU session of a data session type to a data network. The apparatus further includes means, such as the processor 22, the communication interface 26 or the like, for determining the data session type is not supported as shown in block 1802. In block 1804, the apparatus includes means, such as the processor 22, the communication interface 26 or the like, for, transmitting a response message to the PDU session establishment request message indicating that the PDU session establishment request for the PDU session of the data session type to the data network is rejected, wherein the response message comprises a rejection cause.

As described above, FIGS. 17 and 18 each include a flowchart of an apparatus 20, method, and computer program product according to certain example embodiments. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 17. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks outlined in dashed lines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
   causing transmission of a packet data unit, PDU, session establishment request message for a PDU session of a data session type, wherein the data session type is one of an Ethernet type and an internet protocol, IP, type;
   receiving a response message to the PDU session establishment request message indicating that the PDU session establishment request for the PDU session of the data session type is rejected, wherein the response message comprises a rejection cause, the rejection cause indicating that an allowed data session type is only the unstructured type;
   analyzing the rejection cause to identify re-attempt criteria for transmission of a further PDU session establishment request message for a PDU session of the data session type or of a further data session type; and
   after determining that at least one of the re-attempt criteria is satisfied, causing transmission of the further PDU session establishment request message for the PDU session of the data session type or of the further data session type;
   wherein the re-attempt criteria associated with the rejection cause indicating that the allowed data session type is only the unstructured data session type comprises criterion that is satisfied in an instance in which (a) a user equipment, UE, initiates the further PDU session establishment request message of the unstructured data session type, (b) the UE is registered to a different public land mobile network, PLMN, which was not in a list of equivalent PLMNs at the time when the PDU session establishment request message was transmitted, or (c) the UE is registered to a different PLMN which was in the list of equivalent PLMNs at the time when the response message to the PDU session establishment request message was received and a re-attempt indicator included in the response message to the PDU session establishment request message indicated that re-attempt in an equivalent PLMN is allowed.

2. A method according to claim 1 wherein causing transmission of a PDU session establishment request message comprises causing transmission of the PDU session establishment request from the UE to a data network.

3. A method according to claim 1 wherein causing transmission of a PDU session establishment request message comprises causing transmission of the PDU session establishment request from the UE to an Access and Mobility Management Function, AMF.

4. A method according to claim 3 wherein causing transmission of the PDU session establishment request from the UE to the AMF comprises causing transmission of a non-access stratum, NAS, message to the AMF that encapsulates the PDU session establishment request.

5. A method according to claim 1 wherein the method is implemented by the UE.

6. An apparatus comprising:
   at least one processor; and
   at least one memory including computer program code, the at least one memory and the computer program code configured to, with the at least one processor, cause the apparatus to at least:

cause transmission of a packet data unit, PDU, session establishment request message for a PDU session of a data session type, wherein the data session type is one of an Ethernet type and an internet protocol, IP, type;

receive a response message to the PDU session establishment request message indicating that the PDU session establishment request for the PDU session of the data session type is rejected, wherein the response message comprises a rejection cause, the rejection cause indicating that an allowed data session type is only the unstructured type;

analyze the rejection cause to identify re-attempt criteria for transmission of a further PDU session establishment request message for a PDU session of the session type or of a further data session type; and after determining that at least one of the re-attempt criteria is satisfied, cause transmission of the further PDU session establishment request message for the PDU session of the data session type or of the further data session type;

wherein the re-attempt criteria associated with the rejection cause indicating that the allowed data session type is only the unstructured data session type comprises criterion that is satisfied in an instance in which (a) a user equipment, UE, initiates the further PDU session establishment request message of the unstructured data session type, (b) the UE is registered to a different public land mobile network, PLMN, which was not in a list of equivalent PLMNs at the time when the PDU session establishment request message was transmitted, or (c) the UE is registered to a different PLMN which was in the list of equivalent PLMNs at the time when the response message to the PDU session establishment request message was received and a re-attempt indicator included in the response message to the PDU session establishment request message indicated that re-attempt in an equivalent PLMN is allowed.

7. An apparatus according to claim 6 wherein the at least one memory and the computer program code are configured to, with the at least one processor, cause the apparatus to cause transmission of a PDU session establishment request message by causing transmission of the PDU session establishment request from the UE to a data network.

8. An apparatus according to claim 6 wherein the at least one memory and the computer program code are configured to, with the at least one processor, cause the apparatus to cause transmission of a PDU session establishment request message by causing transmission of the PDU session establishment request from the UE to an Access and Mobility Management Function, AMF.

9. An apparatus according to claim 8 wherein the at least one memory and the computer program code are configured to, with the at least one processor, cause the apparatus to cause transmission of the PDU session establishment request from the UE to the AMF by causing transmission of a non-access stratum, NAS, message to the AMF that encapsulates the PDU session establishment request.

10. An apparatus according to claim 6 wherein the apparatus is embodied by the UE.

11. A method comprising:

causing transmission of a packet data unit, PDU, session establishment request message for a PDU session of a data session type, wherein the data session type is one of an unstructured type and an internet protocol, IP, type;

receiving a response message to the PDU session establishment request message indicating that the PDU session establishment request for the PDU session of the data session type is rejected, wherein the response message comprises a rejection cause, the rejection cause indicating that an allowed data session type is only the Ethernet type;

analyzing the rejection cause to identify re-attempt criteria for transmission of a further PDU session establishment request message for a PDU session of the data session type or of a further data session type; and after determining that at least one of the re-attempt criteria is satisfied, causing transmission of the further PDU session establishment request message for the PDU session of the data session type or of the further data session type;

wherein the re-attempt criteria associated with the rejection cause indicating that the allowed data session type is only the Ethernet data session type comprises criterion that is satisfied in an instance in which (a) a user equipment, UE, initiates the further PDU session establishment request message of the Ethernet data session type, (b) the UE is registered to a different public land mobile network, PLMN, which was not in a list of equivalent PLMNs at the time when the PDU session establishment request message was transmitted, or (c) the UE is registered to a different PLMN which was in the list of equivalent PLMNs at the time when the response message to the PDU session establishment request message was received and a re-attempt indicator included in the response message to the PDU session establishment request message indicated that re-attempt in an equivalent PLMN is allowed.

12. A method according to claim 11 wherein causing transmission of a PDU session establishment request message comprises causing transmission of the PDU session establishment request from the UE to a data network.

13. A method according to claim 11 wherein causing transmission of a PDU session establishment request message comprises causing transmission of the PDU session establishment request from the UE to an Access and Mobility Management Function, AMF.

14. A method according to claim 13 wherein causing transmission of the PDU session establishment request from the UE to the AMF comprises causing transmission of a non-access stratum, NAS, message to the AMF that encapsulates the PDU session establishment request.

15. A method according to claim 11 wherein the method is implemented by the UE.

16. An apparatus comprising:

at least one processor; and at least one memory including computer program code, the at least one memory and the computer program code configured to, with the at least one processor, cause the apparatus to at least:

cause transmission of a packet data unit, PDU, session establishment request message for a PDU session of a data session type, wherein the data session type is one of an unstructured type and an internet protocol, IP, type;

receive a response message to the PDU session establishment request message indicating that the PDU session establishment request for the PDU session of the data session type is rejected, wherein the response message comprises a rejection cause, the rejection cause indicating that an allowed data session type is only the Ethernet type;
analyze the rejection cause to identify re-attempt criteria for transmission of a further PDU session establishment request message for a PDU session of the session type or of a further data session type; and
after determining that at least one of the re-attempt criteria is satisfied, cause transmission of the further PDU session establishment request message for the PDU session of the data session type or of the further data session type;
wherein the re-attempt criteria associated with the rejection cause indicating that the allowed data session type is only the Ethernet data session type comprises criterion that is satisfied in an instance in which (a) a user equipment, UE, initiates the further PDU session establishment request message of the Ethernet data session type, (b) the UE is registered to a different public land mobile network, PLMN, which was not in a list of equivalent PLMNs at the time when the PDU session establishment request message was transmitted, or (c) the UE is registered to a different PLMN which was in the list of equivalent PLMNs at the time when the response message to the PDU session establishment request message was received and a re-attempt indicator included in the response message to the PDU session establishment request message indicated that re-attempt in an equivalent PLMN is allowed.

17. An apparatus according to claim 16 wherein the at least one memory and the computer program code are configured to, with the at least one processor, cause the apparatus to cause transmission of a PDU session establishment request message by causing transmission of the PDU session establishment request from the UE to a data network.

18. An apparatus according to claim 16 wherein the at least one memory and the computer program code are configured to, with the at least one processor, cause the apparatus to cause transmission of a PDU session establishment request message by causing transmission of the PDU session establishment request from the UE to an Access and Mobility Management Function, AMF.

19. An apparatus according to claim 18 wherein the at least one memory and the computer program code are configured to, with the at least one processor, cause the apparatus to cause transmission of the PDU session establishment request from the UE to the AMF by causing transmission of a non-access stratum, NAS, message to the AMF that encapsulates the PDU session establishment request.

20. An apparatus according to claim 16 wherein the apparatus is embodied by the UE.

* * * * *